United States Patent
Avupati et al.

(10) Patent No.: US 12,503,314 B2
(45) Date of Patent: Dec. 23, 2025

(54) RECONFIGURABLE MOTORIZED CONVEYOR ROLLER AND METHOD OF USING THE SAME

(71) Applicant: Intelligrated Headquarters, LLC, Mason, OH (US)

(72) Inventors: Ravi Kumar Avupati, Hyderabad (IN); Saravanan Sadasivan, Bangalore (IN); Abhishek Kolay, Howrah (IN)

(73) Assignee: Intelligrated Headquarters, LLC, Mason, OH (US)

( * ) Notice: Subject to any disclaimer, the term of this patent is extended or adjusted under 35 U.S.C. 154(b) by 708 days.

(21) Appl. No.: 17/821,095

(22) Filed: Aug. 19, 2022

(65) Prior Publication Data
US 2024/0059495 A1  Feb. 22, 2024

(51) Int. Cl.
*B65G 39/02* (2006.01)

(52) U.S. Cl.
CPC ................... *B65G 39/02* (2013.01)

(58) Field of Classification Search
None
See application file for complete search history.

(56) References Cited

U.S. PATENT DOCUMENTS

| | | | |
|---|---|---|---|
| 6,280,371 B1 * | 8/2001 | Krippelz | F16C 13/00 492/40 |
| 9,919,875 B2 | 3/2018 | Paulides et al. | |
| 9,926,140 B2 * | 3/2018 | Itoh | G01M 99/00 |
| 2019/0233216 A1 | 8/2019 | Van Holthe Tot Echten | |

FOREIGN PATENT DOCUMENTS

| | | |
|---|---|---|
| CN | 107758229 A | 3/2018 |
| CN | 112591391 A | 4/2021 |
| CN | 214269033 U * | 9/2021 |

OTHER PUBLICATIONS

"Catalog: Conveyor Rollers Rollerdrive Controls," Interroll, 142 pages, (2018).

* cited by examiner

*Primary Examiner* — Kavel Singh
(74) *Attorney, Agent, or Firm* — Alston & Bird LLP

(57) ABSTRACT

Various embodiments are directed to reconfigurable motorized conveyor rollers and methods of using the same. In various embodiments, a reconfigurable motorized conveyor roller comprises a housing assembly defining a roller width defined between a first lateral end and a second lateral end opposite the first lateral end; and a housing adjustment assembly disposed within the housing assembly that is operable to adjust the roller width by facilitating a configuration of the housing assembly between a nominal configuration and an expanded configuration; wherein the housing assembly comprises a plurality of coaxial housing components configured for movement relative to one another in one or more lateral directions, and wherein the housing adjustment assembly is operable to cause at least a portion of the plurality of housing components to move in the one or more lateral directions to selectively configure the housing assembly between the nominal configuration and the expanded configuration.

16 Claims, 14 Drawing Sheets

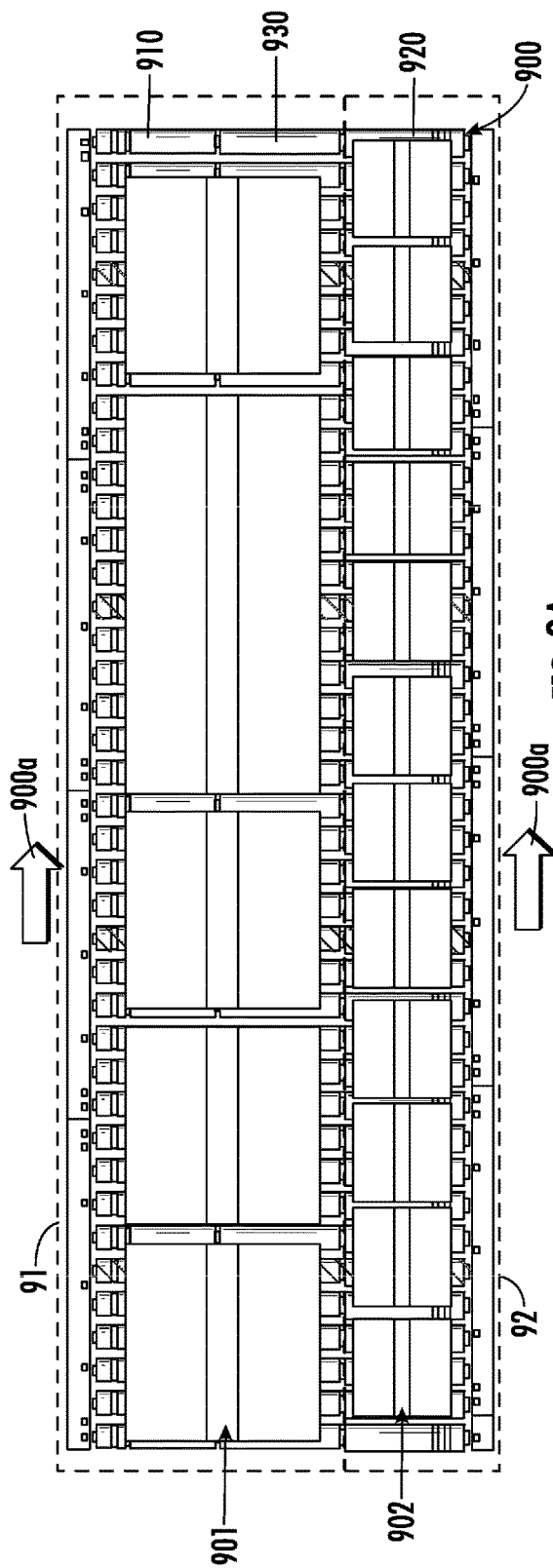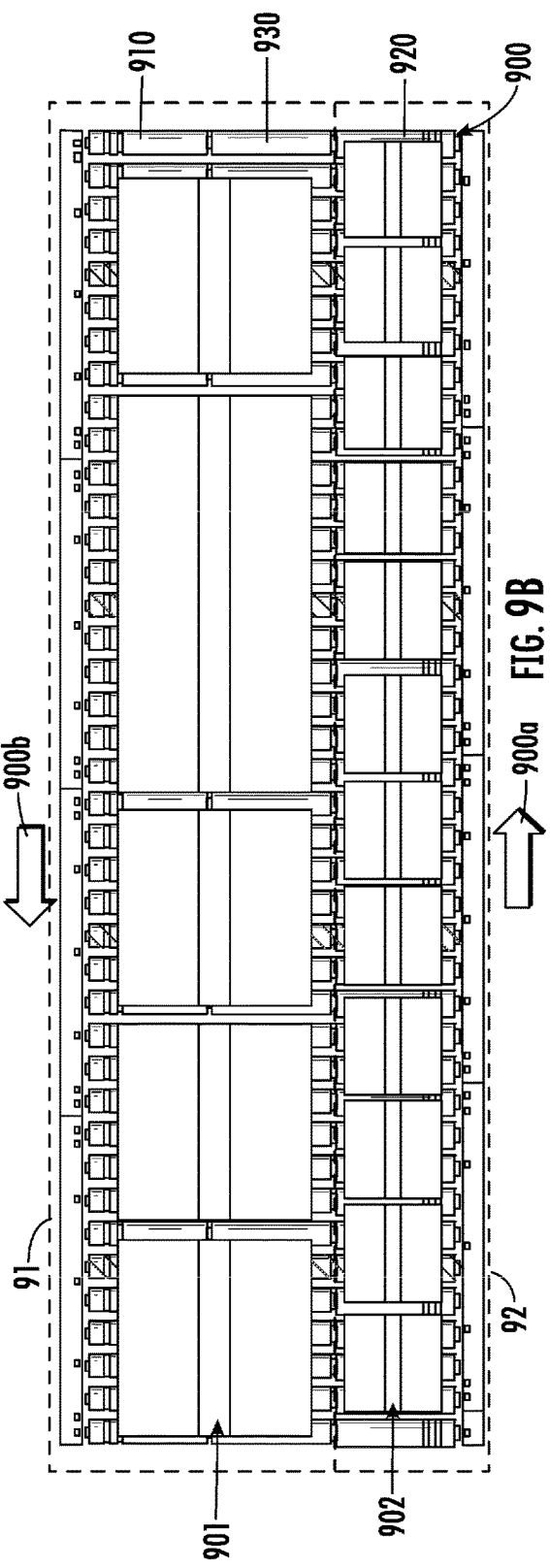

RECONFIGURABLE MOTORIZED CONVEYOR ROLLER AND METHOD OF USING THE SAME

FIELD OF THE INVENTION

Various embodiments of the present invention relates generally to a material handling system for handling items, and, more particularly, to motorized roller apparatuses for use with conveyor systems.

BACKGROUND

Conveyor systems and assemblies may be used in industrial manufacturing and packing applications, for example, to facilitate the transportation of a large number of objects to a desired destination within a factory or a warehouse. These conveyor systems and assemblies often utilize one or more motorized roller apparatuses to drive transportation of the objects along a transportation path defined by the conveyor assembly. Many motorized roller apparatuses and devices for conveyor assemblies are plagued by technical challenges and limitations. Through applied effort, ingenuity, and innovation, the problems identified herein have been solved by developing solutions that are included in embodiments of the present disclosure, many examples of which are described in detail herein.

BRIEF SUMMARY

Various embodiments are directed to reconfigurable motorized conveyor rollers and methods of using the same. In various embodiments, a reconfigurable motorized conveyor roller may comprise a housing assembly defining a roller width defined between a first lateral end and a second lateral end opposite the first lateral end; and a housing adjustment assembly disposed within the housing assembly that is operable to adjust the roller width by facilitating a configuration of the housing assembly between a nominal configuration and an expanded configuration; wherein the housing assembly comprises a plurality of coaxial housing components configured for movement relative to one another in one or more lateral directions, and wherein the housing adjustment assembly is operable to cause at least a portion of the plurality of housing components to move in the one or more lateral directions to selectively configure the housing assembly between the nominal configuration and the expanded configuration.

In various embodiments, at least a portion of the plurality of housing components may define a telescoping configuration. In various embodiments, each of the plurality of housing components may define hollow cylindrical components. In various embodiments, the plurality may comprise an outer housing component and a central housing component configured to be at least partially disposed within the outer housing portion when the housing assembly is configured in the nominal configuration, and wherein the outer housing component is selectively moveable relative to the central housing component in the one or more lateral directions. In various embodiments, the plurality of housing components may further comprise a second outer housing component, the outer housing component being operatively connected to a first lateral side of the central housing component and the second outer housing component being operatively connected to a second lateral end of the outer housing component. In various embodiments, the housing adjustment assembly may be configured to adjust the roller width by being operated such that the first outer housing component and the second outer housing component are moved in opposite lateral directions relative to one another. In certain embodiments, the plurality of housing components may further comprise an intermediate housing component that is operatively connected to the outer housing component at a first lateral intermediate housing component end and operatively connected to the central housing component at a second lateral intermediate housing component end.

In various embodiments, the housing adjustment assembly may be operable to cause the housing assembly to be reconfigured from the nominal configuration to the expanded configuration as part of a roller expansion operation, and operable to cause the housing assembly to be reconfigured from the expanded configuration to the nominal configuration as part of a roller retraction operation. In certain embodiments, the housing adjustment assembly may be operable to cause the housing assembly to be reconfigured from the nominal configuration to the expanded configuration based at least in part on a rotation of a shaft component of the housing adjustment assembly in a first rotational direction, and operable to cause the housing assembly to be reconfigured from the expanded configuration to the nominal configuration based at least in part on a second rotation of the shaft component in a second rotational direction defining an opposite direction relative to the first rotational direction. In various embodiments, the reconfigurable motorized conveyor roller may further comprise a motor assembly and a drive assembly at least partially disposed within the housing that are configured to cause rotation of at least a portion of the reconfigurable motorized conveyor roller, wherein the drive gear is operatively coupled to the motor assembly, and wherein the motor assembly is configured to rotate the drive gear to cause the rotation of the cam slotted gear. In various embodiments, the reconfigurable motorized conveyor roller may further comprise a controller component in electronic communication with the motor assembly, the drive assembly, and the housing adjustment assembly, wherein the controller component is configured to cause a rotation of the drive gear Various embodiments are directed to a method of adjusting a roller width of a reconfigurable motorized conveyor roller, the method comprising providing a reconfigurable motorized conveyor roller comprising: a housing assembly defining a roller width defined between a first lateral end and a second lateral end opposite the first lateral end; and a housing adjustment assembly disposed within the housing assembly that is operable to adjust the roller width by facilitating a configuration of the housing assembly between a nominal configuration and an expanded configuration; wherein the housing assembly comprises a plurality of coaxial housing components configured for movement relative to one another in one or more lateral directions; causing, via the housing adjustment assembly, at least a portion of the plurality of housing components to move in the one or more lateral directions to selectively configure the housing assembly between the nominal configuration and the expanded configuration.

In various embodiments, at least a portion of the plurality of housing components may define a telescoping configuration. In various embodiments, each of the plurality of housing components may define hollow cylindrical components. In various embodiments, the plurality may comprise an outer housing component and a central housing component configured to be at least partially disposed within the outer housing portion when the housing assembly is configured in the nominal configuration, and wherein the outer housing component is selectively moveable relative to the central housing component in the one or more lateral directions.

In various embodiments, the plurality of housing components may further comprise a second outer housing component, the outer housing component being operatively connected to a first lateral side of the central housing component and the second outer housing component being operatively connected to a second lateral end of the outer housing component. In various embodiments, the housing adjustment assembly may be configured to adjust the roller width by being operated such that the first outer housing component and the second outer housing component are moved in opposite lateral directions relative to one another. In various embodiments, the plurality of housing components may further comprise an intermediate housing component that is operatively connected to the outer housing component at a first lateral intermediate housing component end and operatively connected to the central housing component at a second lateral intermediate housing component end. In various embodiments, the housing adjustment assembly may be operable to cause the housing assembly to be reconfigured from the nominal configuration to the expanded configuration as part of a roller expansion operation, and operable to cause the housing assembly to be reconfigured from the expanded configuration to the nominal configuration as part of a roller retraction operation. In various embodiments, the housing adjustment assembly may be operable to cause the housing assembly to be reconfigured from the nominal configuration to the expanded configuration based at least in part on a rotation of a shaft component of the housing adjustment assembly in a first rotational direction, and operable to cause the housing assembly to be reconfigured from the expanded configuration to the nominal configuration based at least in part on a second rotation of the shaft component in a second rotational direction defining an opposite direction relative to the first rotational direction.

BRIEF DESCRIPTION OF THE DRAWINGS

Reference will now be made to the accompanying drawings, which are not necessarily drawn to scale, and wherein:

FIGS. 9A and 9B schematically illustrate a top view of an exemplary conveyor apparatus defining a plurality of a conveyor sections according to example embodiments described herein;

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

Figure 1:
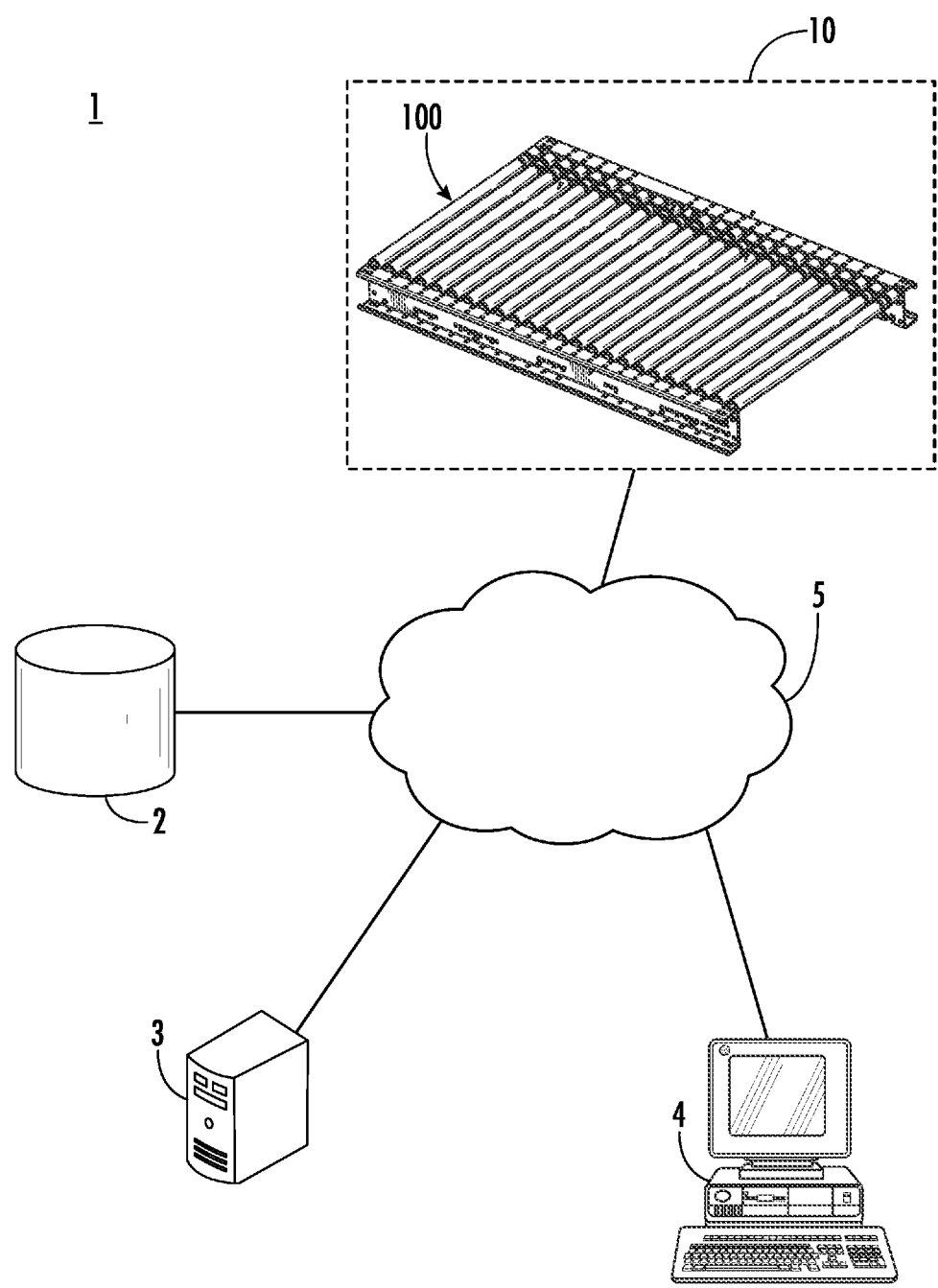
FIG. 1 illustrates an example of a system in accordance with various embodiments of the present disclosure.

Generally, conveyor systems may be used in various industrial and commercial applications to facilitate the transport of objects or cargo. In particular, motor driven roller (MDR) conveyor assemblies, or conveyor assemblies whose mechanism of transport involves the rotation of a plurality of rollers, may be used over other conveyor systems (e.g., belt conveyor systems) due to finer control over object transportation. For example, FIG. 1 illustrates a schematic diagram depicting an example system 1 in accordance various embodiments of the present disclosure. As depicted, the example system 1 includes a conveyor assembly 10 comprising one or more motorized conveyor rollers, one or more computing entities 3 (e.g., servers), one or more databases 2, one or more networks 5, one or more user computing entities 4, and/or the like. In various examples, the system 1 can operate to convey objects within a particular location or environment.

In various embodiments, the conveyor assembly 10 can be configured to transport objects within a particular location or environment utilizing one or more motorized conveyor rollers. In some embodiments, the conveyor assembly 10 includes one or more motorized conveyor rollers, the one or more computing entities 3, the one or more databases 2 and/or the one or more user computing entities 4 are in electronic communication with each other over the one or more networks 5 such that they can exchange data (e.g., receive and transmit data) with one another (e.g., periodically and/or in response to requests). Each of the components of the system 1 can be in communication with one another over the same or different wireless or wired networks 5 including, for example, a wired or wireless Personal Area Network (PAN), Local Area Network (LAN), Metropolitan Area Network (MAN), Wide Area Network (WAN), cellular network, and/or the like. While FIG. 1 illustrates certain system components as separate, standalone devices, the various embodiments are not limited to this particular architecture.

As depicted in FIG. 1, the example system 1 includes one or more computing entities 3. In general, the terms computing device, entity, device, system, and/or similar words used herein interchangeably can refer to, for example, one or more computers, computing devices, computing entities, desktop computers, mobile phones, tablets, phablets, notebooks, laptops, distributed systems, terminals, servers or server networks, blades, gateways, switches, processing devices, set-top boxes, relays, routers, network access points, base stations, the like, and/or any combination of devices adapted to perform the functions, operations, and/or processes described herein. Such functions, operations, and/or processes can include, for example, transmitting, receiving, operating on, processing, displaying, storing, determining, generating/creating, monitoring, evaluating, comparing, and/or similar terms used herein interchangeably. In one embodiment, these functions, operations, and/or processes can be performed on data, content, information, and/or similar terms used herein interchangeably.

In some examples, the computing entity 3 can also include one or more network and/or communications interfaces for communicating with various computing entities, such as by communicating data, content, information, and/or similar terms used herein interchangeably that can be transmitted, received, operated on, processed, displayed, stored, and/or the like.

In one embodiment, the computing entity 3 can further include or be in communication with non-volatile media (also referred to as non-volatile storage, memory, memory storage, memory circuitry and/or similar terms used herein interchangeably). In one embodiment, the non-volatile storage or memory can include one or more non-volatile storage or memory media as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media can store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably can refer to a structured collection of records or information/data that is stored in a computer-readable storage medium, such as via a relational database, hierarchical database, and/or network database.

In one embodiment, the computing entity 3 can further include or be in communication with volatile media (also referred to as volatile storage, memory, memory storage, memory circuitry and/or similar terms used herein interchangeably). In one embodiment, the volatile storage or memory can also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media can be used to store at least portions of the databases, database instances, database management system entities, data, applications, programs, program modules, scripts, source code, object code, byte code, compiled code, interpreted code, machine code, executable instructions, and/or the like being executed by, for example, the processing element. Thus, the databases, database instances, database management system entities, data, applications, programs, program modules, scripts, source code, object code, byte code, compiled code, interpreted code, machine code, executable instructions, and/or the like can be used to control certain aspects of the operation of the computing entity 3 with the assistance of the processing element and the operating system.

As indicated, in one embodiment, the computing entity 3 can also include one or more network and/or communications interfaces for communicating with various computing entities, such as by communicating data, content, information, and/or similar terms used herein interchangeably that can be transmitted, received, operated on, processed, displayed, stored, and/or the like. Such communication can be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, computing entity 3 can be configured to communicate via wireless external communication networks using any of a variety of protocols, such as embedded sim (eSIM), remote sim provisioning (RSP), general packet radio service (GPRS), Universal Mobile Telecommunications System (UMTS), Code Division Multiple Access 200 (CDMA200), CDMA200 1X (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), IR protocols, NFC protocols, RFID protocols, IR protocols, ZigBee protocols, Z-Wave protocols, 6LoWPAN protocols, Wibree, Bluetooth protocols, wireless universal serial bus (USB) protocols, and/or any other wireless protocol. The computing entity 3 can use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the computing entity's 3 components can be located remotely from other computing entity 3 components, such as in a distributed system. Furthermore, one or more of the components can be aggregated and additional components performing functions described herein can be included in the computing entity 3. Thus, the computing entity 3 can be adapted to accommodate a variety of needs and circumstances, such as including various components described with regard to a mobile application executing on the user computing entity 4, including various input/output interfaces.

As depicted in FIG. 1, the system 1 includes a user computing entity 4. In various embodiments, the user computing entity 4 can be or include one or more mobile devices, wearable computing devices, and/or the like. An example user computing entity 4 can include an antenna, a transmitter (e.g., radio), a receiver (e.g., radio), and a processing element that provides signals to and receives signals from the transmitter and receiver, respectively. The signals provided to and received from the transmitter and the receiver, respectively, can include signaling information/data in accordance with an air interface standard of applicable wireless systems to communicate with various devices, such as a computing entity (e.g., central server), another user computing entity 4, and/or the like. In an example embodiment, the transmitter and/or receiver are configured to communicate via one or more SRC protocols. For example, the transmitter and/or receiver can be configured to transmit and/or receive information/data, transmissions, and/or the like of at least one of Bluetooth protocols, low energy Bluetooth protocols, NFC protocols, RFID protocols, IR protocols, Wi-Fi protocols, ZigBee protocols, Z-Wave protocols, 6LoWPAN protocols, and/or other short range communication protocol. In various embodiments, the antenna, transmitter, and receiver can be configured to communicate via one or more long range protocols, such as GPRS, UMTS, CDMA200, 1×RTT, WCDMA, GSM, EDGE, TD-SCDMA, LTE, E-UTRAN, EVDO, HSPA, HSDPA, Wi-Fi, Wi-Fi Direct, WiMAX, and/or the like. The user computing entity 4 can also include one or more network and/or communications interfaces for communicating with various computing entities, such as by communicating data, content, information, and/or similar terms used herein interchangeably that can be transmitted, received, operated on, processed, displayed, stored, and/or the like. In this regard, the user computing entity 4 can be capable of operating with one or more air interface standards, communication protocols, modulation types, and access types. More particularly, the user computing entity 4 can operate in accordance with any of a number of wireless communication standards and protocols. In a particular embodiment, the user computing entity 4 can operate in accordance with multiple wireless communication standards and protocols, such as GPRS, UMTS, CDMA200, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 4 can communicate with various other devices using concepts such as Unstructured Supplementary Service information/data (US SD), Short Message Service (SMS), Multimedia Messaging Service (MMS), Dual-Tone Multi-Frequency Signaling (DTMF), and/or Subscriber Identity Module Dialer (SIM dialer). The user computing entity 4 can also download changes, add-ons, and updates, for instance, to its firmware, software (e.g., including executable instructions, applications, program modules), and operating system.

According to one embodiment, the user computing entity 4 can include location determining aspects, devices, modules, functionalities, and/or similar words used herein interchangeably to acquire location information/data regularly, continuously, or in response to certain triggers.

The user computing entity 4 can include a user interface device comprising one or more user input/output interfaces (e.g., a display and/or speaker/speaker driver coupled to a processing element and a touch interface, keyboard, mouse, and/or microphone coupled to a processing element). For example, the user interface can be configured to provide a mobile application, browser, interactive user interface, dashboard, webpage, and/or similar words used herein interchangeably executing on and/or accessible via the user computing entity 4 to cause display or audible presentation of information/data and for user interaction therewith via one or more user input interfaces. Moreover, the user interface can include or be in communication with any of a number of devices allowing the user computing entity 4 to receive information/data, such as a keypad (hard or soft), a touch display, voice/speech or motion interfaces, scanners, readers, or other input device. In embodiments including a keypad, the keypad can include (or cause display of) the conventional numeric (0-9) and related keys (#, *), and other keys used for operating the user computing entity 4 and can include a full set of alphabetic keys or set of keys that can be activated to provide a full set of alphanumeric keys. In addition to providing input, the user input interface can be used, for example, to activate or deactivate certain functions, such as screen savers and/or sleep modes. Through such inputs the user computing entity 4 can capture, collect, store information/data, user interaction/input, and/or the like.

The user computing entity 4 can also include volatile storage or memory and/or non-volatile storage or memory, which can be embedded and/or can be removable. For example, the non-volatile memory can be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory can be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, information/data, applications, programs, program modules, scripts, source code, object code, byte code, compiled code, interpreted code, machine code, executable instructions, and/or the like to implement the functions of the user computing entity 4.

As depicted in FIG. 1, any two or more of the illustrative components of the system 1 of FIG. 1 can be configured to communicate with one another via one or more networks 5. The networks 5 can include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 5 can have any suitable communication range associated therewith and can include, for example, global networks (e.g., the Internet), MANs, WANs, LANs, or PANs. In addition, the networks 5 can include any type of medium over which network traffic can be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

While FIG. 1 provides an example system 1, it is noted that the scope of the present disclosure is not limited to the example shown in FIG. 1. In some examples, the system 1 can include one or more additional and/or alternative elements, and/or can be different from that illustrated in FIG. 1.

Figure 2:
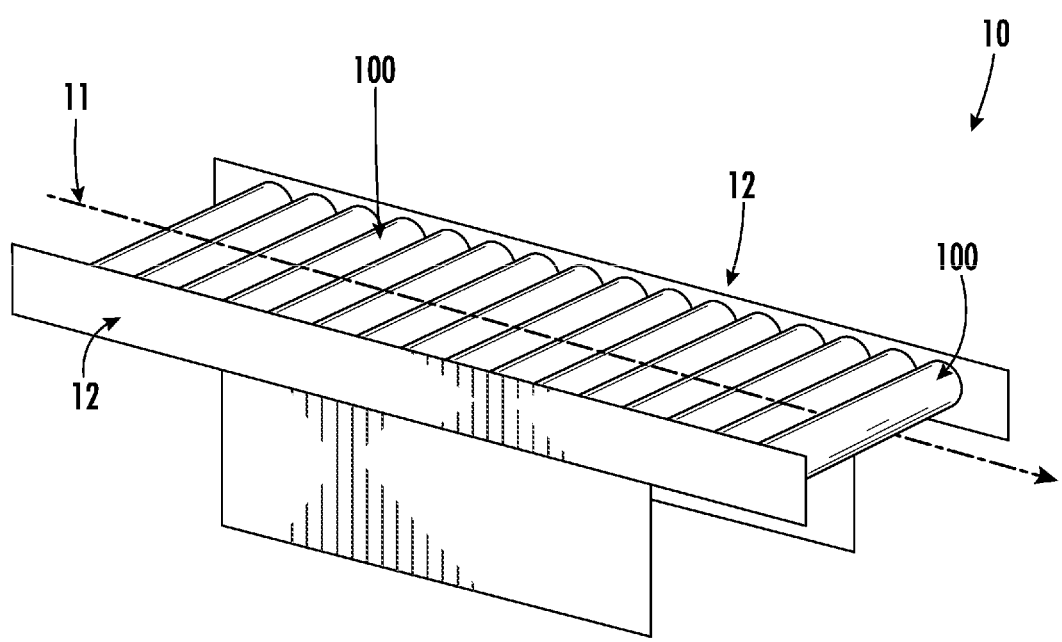
FIG. 2 illustrates a perspective view of an exemplary conveyor assembly according to various embodiments described herein.

FIG. 2 illustrates a perspective view of an example MDR conveyor assembly 10 that is configured to transport an object along a transportation path 11. The transportation path 11 generally defines a path through which an object may be transported from an infeed point to a discharge point. That is, in various examples, the transportation path 11 may extend from an infeed point at one end to a discharge point at another end. The infeed point may refer to a location at which the MDR conveyor assembly 10 receives objects for transportation. For example, an operator (e.g., human, manually operated, autonomous) may place an object on an upper surface of the MDR conveyor assembly 10 at an infeed point to allow for the object to be transported via the MDR conveyor assembly 10 to a discharge point through the transportation path 11. As another example, the infeed point may be positioned at and/or substantially near a discharge point of a preceding conveyor system, such that objects transported to the infeed point by the preceding conveyor system can be directly transported further to the discharge point of the MDR conveyor assembly 10 through the transportation path 11.

In various examples, the transportation path 11 may be at least substantially linear; that is, the MDR conveyor assembly 10 is configured to directly transport objects in a substantially straight path from an infeed point to a discharge point. In other various examples, the transportation path 11 may be non-linear and may include various turns, curves, diverting points, intersections, and/or the like. For instance, the MDR conveyor assembly 10 may be configured to have a non-linear transportation path due to physical and/or environmental constraints, such as various obstacles and infrastructure within a warehouse. Similarly, the MDR conveyor assembly 10 may be configured to have a non-linear transportation path such that objects may be transported near and past various environmental points, for example, where operator stations may be positioned to perform various processing tasks on the transported objects. It will be understood, however, that transportation of objects near and past various environmental points is not limited to MDR conveyor assemblies 10 with non-linear transportation paths, and MDR conveyor assemblies 10 with linear transportation paths may similar be configured to transport objects near and past various environmental points.

In some example instances, the MDR conveyor assembly 10 is configured to be capable of reversing the transportation path 11 along at least a portion of a conveying surface defined by the assembly 10. In doing so, the MDR conveyor assembly 10 may then transport objects from the previous discharge point to the previous infeed point. Similarly, a MDR conveyor assembly 10 having various intersections and/or diverting points may include multiple transportation paths 11 that extend through different segments of the MDR conveyor assembly 10 connected at said intersections and/or diverting points. In various example embodiments, the MDR conveyor assembly 10 is configured to transport different objects along different transportation paths 11 through various intersections and/or diverting points, such as for sorting tasks. Thus, while FIG. 2 illustrates one transportation path 11 for the MDR conveyor assembly 10, it will be understood that a MDR conveyor assembly 10 may be configured for any number of transportation paths 11 that may be linear and/or non-linear.

As illustrated, the MDR conveyor assembly 10 comprises a plurality of rollers 100 positioned along the transportation path 11. As described herein, in various embodiments, an exemplary roller 100 may be substantially cylindrically-shaped, and a roller may include a central rotational axis, a length along said axis, and a radius from the central rotational axis. An outer cylindrical surface of a roller 100 is configured to interface with an object disposed on the MDR conveyor assembly 10, or tangentially above the roller 100, and to translate the object in the transportation path 11 through rotation of the roller 100 about its central rotational axis. In some examples, the roller 100 is configured to interface and translate objects using a coating or a material on the outer cylindrical surface that is configured with a high friction coefficient.

Specifically, the plurality of rollers 100 of the MDR conveyor assembly 10 are positioned along the transportation path 11 such that the central rotational axis of each roller 100 is at least substantially perpendicular to the transportation path. Understood otherwise, the transportation path 11 of a MDR conveyor assembly 10 may be defined as a path (e.g., linear, non-linear) that is at least substantially perpendicular to the central rotational axes of the plurality of rollers 100 of the MDR conveyor assembly 10.

The plurality of rollers 100 of the MDR conveyor assembly 10 may be positioned between at least two sidewalls 12 that generally define a roller housing. Each roller 100 may be secured a sidewall 12 at each respective end such that translational movement of each roller 100 in significantly restricted. Thus, each roller 100 may be limited due only rotational movement about respective central rotational axes, as each roller 100 is secured to and between the at least two sidewalls 12. A roller 100 may be fixedly secured between the at least two sidewalls 12 at either end of its central rotational axis. In some examples, a roller 100 comprises an axle, rod, and/or the like defining its central rotational axis, and said axle, rod, and/or the like is secured to the at least two sidewalls 12. In various embodiments, the at least two sidewalls 12 and the lengths of the plurality of rollers 100 (e.g., that span between the at least two sidewalls 12) are configured based at least in part on a width of the objects to be transported by the MDR conveyor assembly 10. For instance, a MDR conveyor assembly 10 to be used for transporting parcels limited to a maximum width and/or dimension, the at least two sidewalls 12 and the lengths of the plurality of rollers 100 may be at least greater than said maximum width and/or dimension. With the plurality of rollers 100 being positioned between the sidewalls 12, it may be appreciated that the sidewalls 12 extend at least substantially parallel with the transportation path 11.

Figure 3:
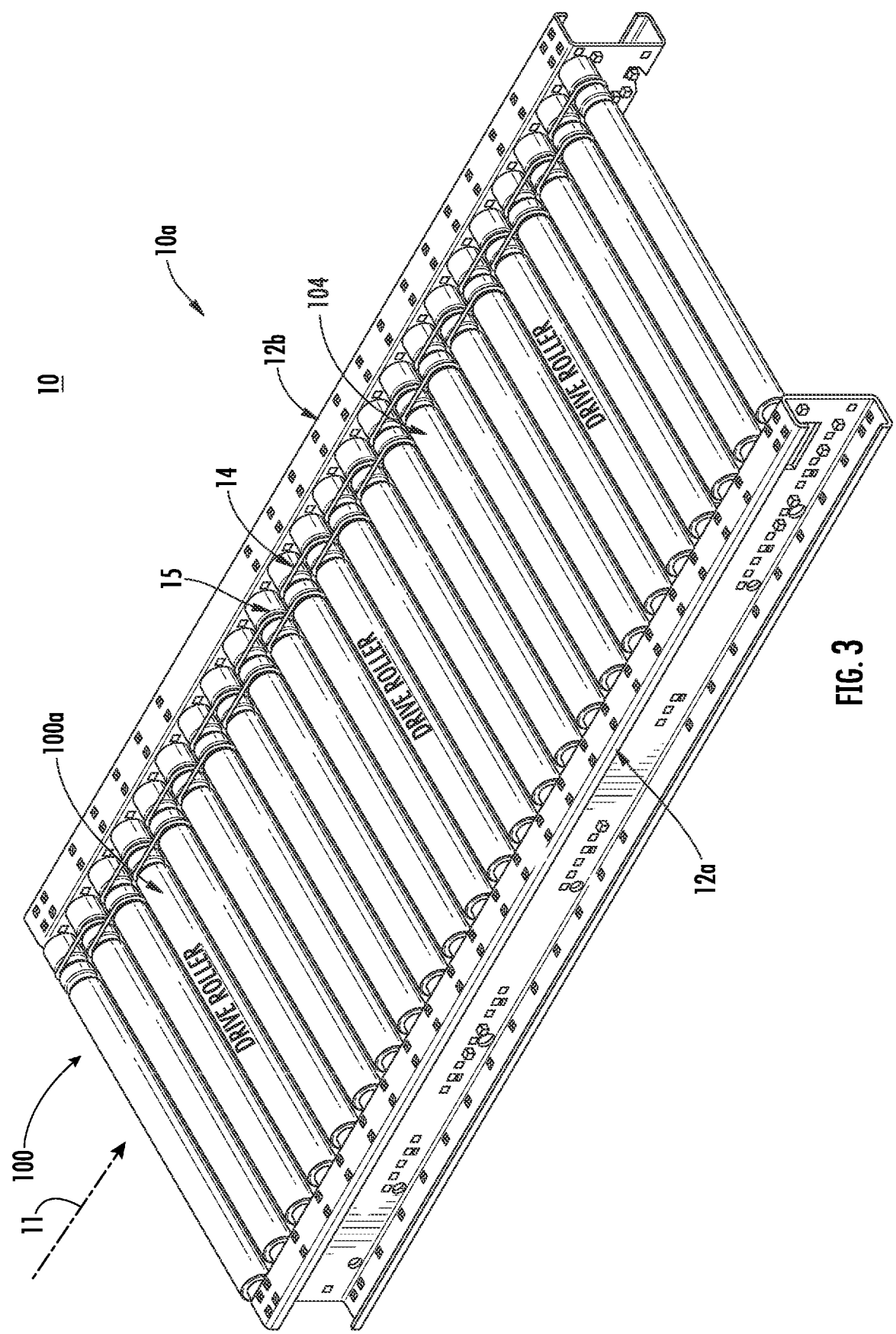
FIG. 3 a perspective view of a conveyor apparatus of an exemplary conveyor assembly according to various embodiments described herein.

In various embodiments, the plurality of rollers 100 of an exemplary conveyor assembly 10 may comprise at least one idler roller and at least one drive roller (e.g., a motor driven roller (MDR)) operatively engaged with the at least one idler roller such that drive roller may be used to cause rotation (e.g., operation) of the at least one idler roller to facilitate control the idler roller based at least in part on the at least one idler roller exhibiting a corresponding to that of the drive roller operatively engaged therewith. As an illustrative example, FIG. 3 illustrates a perspective view of an example conveyor apparatus of a conveyor assembly with a plurality of rollers including both motorized drive rollers and non-motorized idler rollers in accordance with various embodiments of the present disclosure. In some embodiments, the example portion of a conveyor apparatus 10a may define a particular section or conveyor zone of the conveyor assembly 10.

In various embodiments, an exemplary conveyor apparatus 10 may include a conveyor apparatus 10a comprising a plurality of rollers 100 defining a conveyor section configured for transporting one or more objects disposed thereon along a transportation path 11. As depicted in FIG. 3, the plurality of rollers 100 may comprise at least one motorized conveyor rollers, e.g., motorized conveyor roller 100a, and one or more non-motorized conveyor rollers, e.g., non-motorized conveyor roller 100b. In the embodiment depicted in FIG. 3, the example conveyor assembly 10 further comprises at least a first conveyor sidewall 12a and a second conveyor sidewall 12b. As depicted in FIG. 3, the plurality of motorized conveyor rollers and non-motorized conveyor rollers (e.g., motorized conveyor roller 101 and non-motorized conveyor roller 102) may be mechanically/operatively coupled to the first and second conveyor sidewalls 12a, 12b. In some embodiments, the first conveyor sidewall 12a and a second conveyor sidewall 12b may include one or more sets of apertures configured to receive the plurality of motorized conveyor rollers and non-motorized conveyor rollers (e.g., motorized conveyor roller 100a and non-motorized conveyor roller 100b).

In some embodiments, as depicted in FIG. 3, a non-motorized conveyor roller (e.g., non-motorized conveyor roller 100b) of the plurality of rollers 100 may be and/or comprise an idler roller or a driven roller. A motorized conveyor roller (e.g., motorized conveyor roller 100a) may be and/or comprise a drive roller, such as, for example, a motor driven roller (MDR), as described herein. In various embodiments, a drive roller 100a may be configured to drive at least one idler roller 100b of the plurality of rollers 100. For example, drive roller 100a may be configured to drive at least one idler roller 100b operatively engaged therewith via one or more drive bands 14 engaged with the drive roller 100a and one or more of the at least one idler roller 100b. In various embodiments, a drive band 14 may comprise an O-drive band configured to facilitate an operative engagement between a drive roller 100a and at least one idler roller 100b to enable the idler roller 100b to be driven by a rotation of the drive roller 100a. As depicted in FIG. 3, in various embodiments, one or more drive rollers (e.g., drive roller 100a) and at least one idler roller (e.g., idler roller 100b) may be connected to each other through a series of drive bands 14 in order to drive each of the one or more the idler rollers 100b (e.g., in response to a rotation/operation of the one or more drive roller 100a). As further depicted, in various embodiments, a drive bands 14 may be received around a tracking ring 15 (e.g., tracking groove) provided on a drive roller and/or an idler roller. For example, a tracking ring 15 may operate to ensure that a drive band 14 engaged therewith does not slip out of the roller defining the tracking ring 15 (e.g., the drive roller 100a and/or the idler roller 100b) when the roller is operated (e.g., rotated) at full speed. Further, a drive band 14 may be connected to idler pulleys provided on/attached to either the first or the second conveyor sidewall 12a, 12b of the conveyor assembly 10 to maintain a target tension between the drive band 14 and one or more of the plurality of rollers 100 (e.g., a drive roller 100a and/or an idler roller 100b) with which the band 14 is engaged.

In various embodiments, one or more motors of a conveyor assembly 10 (e.g., a motor assembly defined within an internal roller portion of an exemplary driver motor 100a) may be unidirectional to facilitate a rotation of the rollers 100 in one of a clockwise or a counter-clockwise rotational direction. Further, one or more motors of an exemplary conveyor assembly 10 may be operated to apply rotation of the plurality of rollers 100 in a consistent direction, such that the plurality of rollers 100 of the conveyor assembly 10 may either all rotate clockwise or rotate counter-clockwise. Further still, in various embodiments, the conveyor assembly 10 may include bidirectional motors. Using bidirectional motors, the rotation of the plurality of rollers 100 may be reversed (e.g., from clockwise to counter-clockwise, and vice versa), also causing reversal of the transportation path 11.

While FIG. 3 depicts an example conveyor apparatus 10a of an exemplary conveyor assembly 10 according to various embodiments described herein, it is noted that the scope of the present disclosure is not limited to the example shown in FIG. 3. An example conveyor apparatus 10a of an exemplary conveyor assembly 10 in accordance with the present disclosure may comprise one or more additional and/or alternative elements, and/or may be different from that illustrated in FIG. 3.

Figure 4A:
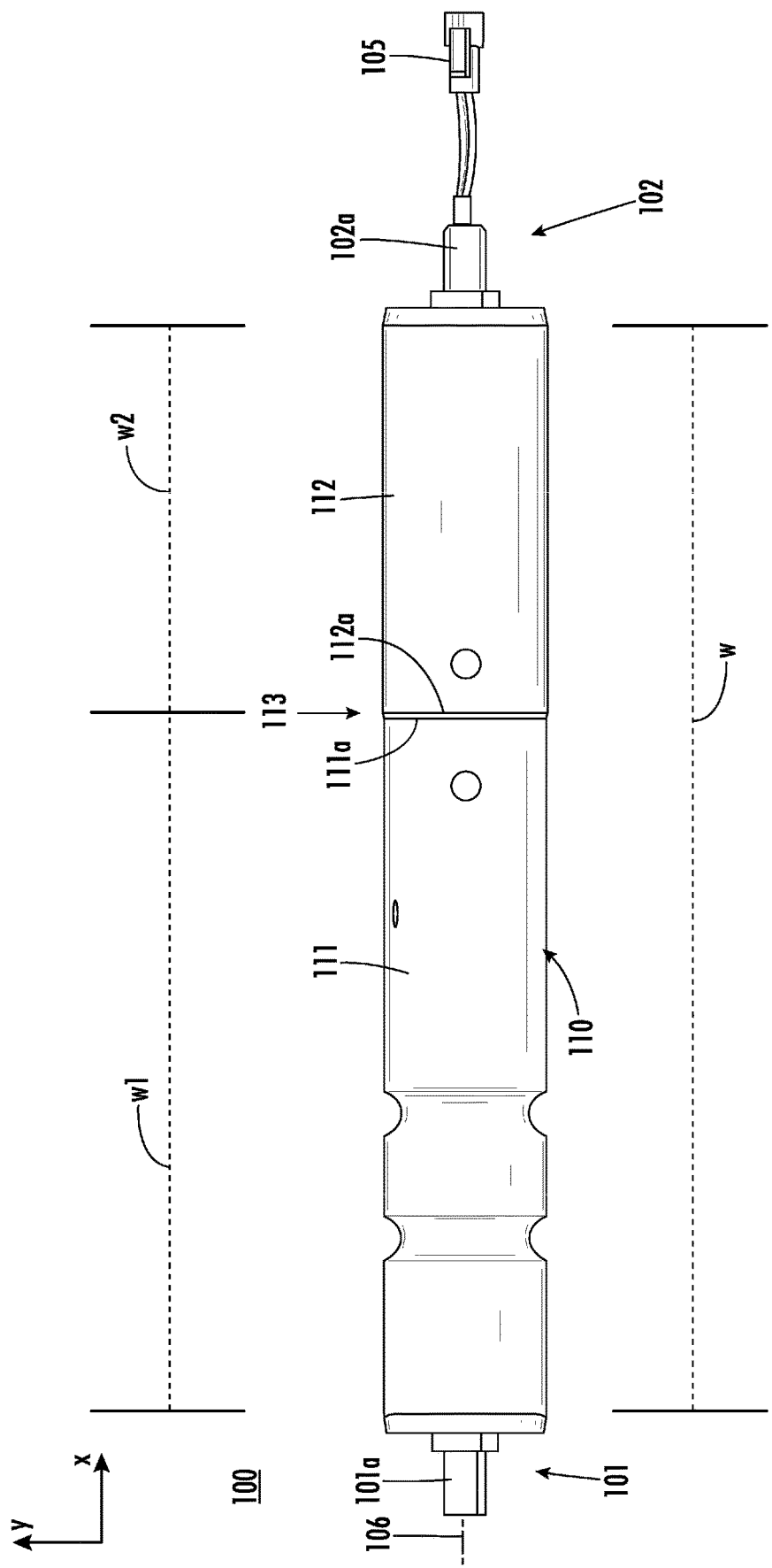
FIGS. 4A-4C illustrate perspective views of exemplary reconfigurable drive rollers according to various embodiments described herein.
Figure 4B:
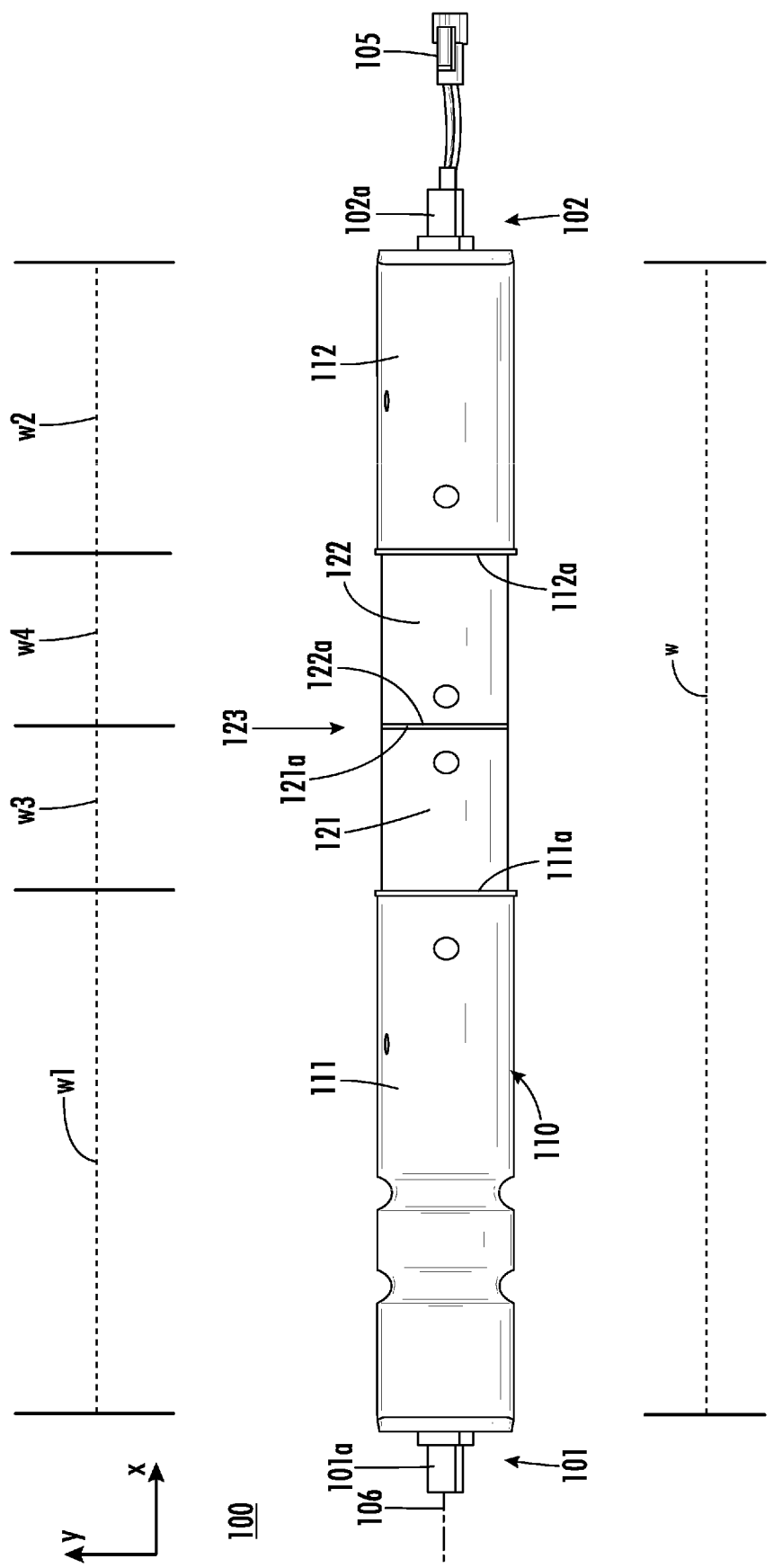
Figure 4C:
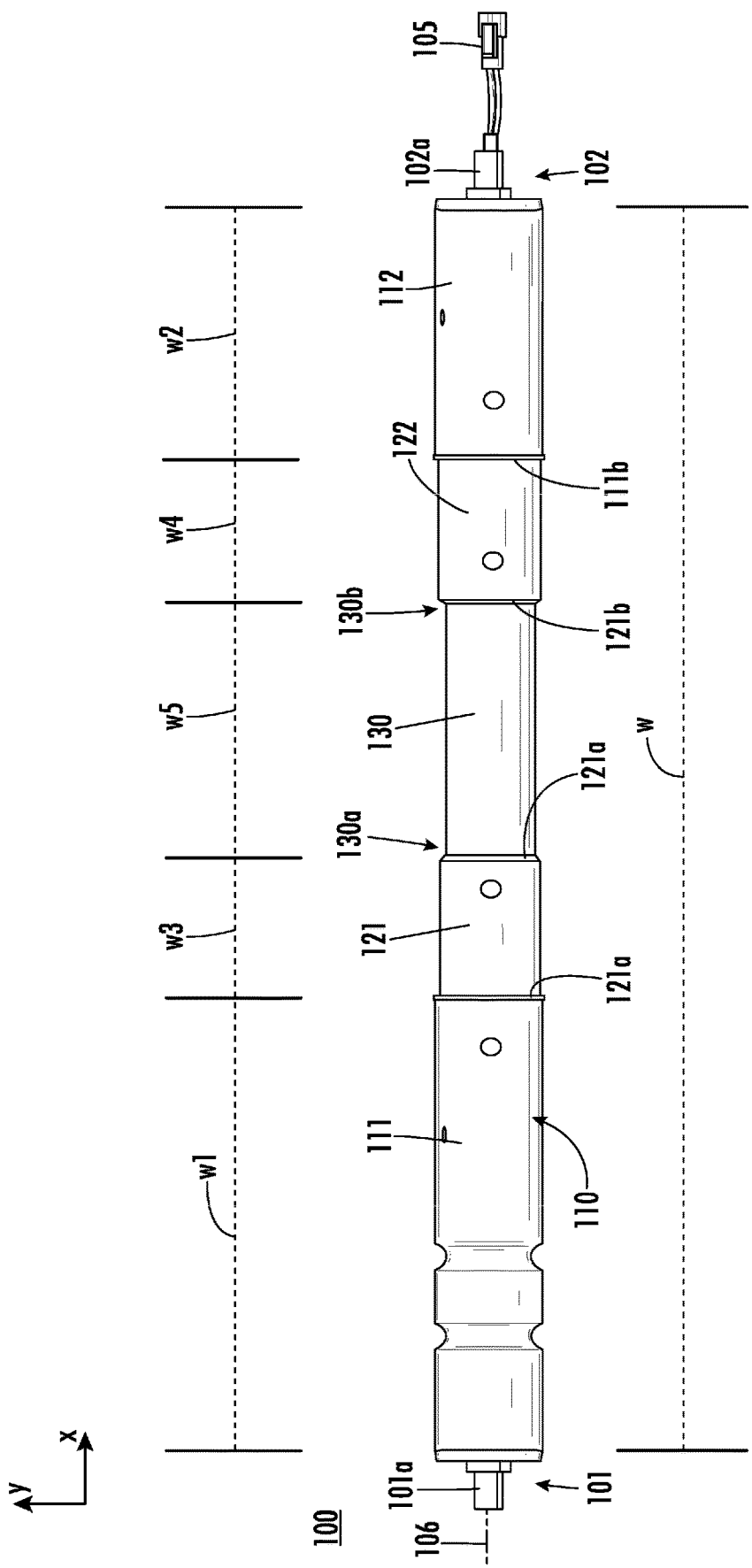

FIGS. 4A-4C illustrate various perspective views of an exemplary drive roller provided in various configurations according to various embodiments described herein. In particular, FIGS. 4A, 4B, and 4C illustrate perspective views of an exemplary drive roller provided in a nominal configuration, a first expanded configuration, and a second expanded configuration, respectively, according to various embodiments described herein. In various embodiments, an exemplary drive roller 100 may comprise a reconfigurable motorized conveyor roller, such as, for example, a motorized drive roller (MDR), that is configured to be operated by a drive motor that causes the roller 100 to rotate about a central axis 106. As described herein, in various embodiments, the example drive roller 100 may be part of a conveyor assembly/conveyor system (e.g., the conveyor section of the conveyor apparatus described above in connection with FIG. 3) and may be configured to drive one or more idler rollers (e.g., non-motorized conveyor rollers) that are operatively coupled thereto. Further, in various embodiments, the drive roller 100 may be selectively reconfigured between a nominal configuration and an expanded configuration by a housing adjustment assembly that is operable to adjust a roller width defined by the drive roller 100.

In various embodiments, as depicted in FIG. 4A, an exemplary drive roller 100 may comprise a housing assembly 110 (e.g., roller tube) configured to contain one or more components/elements of the drive roller 100 (e.g., a housing adjustment assembly), a first end cap 101 defining a first end/surface of the example drive roller 100, and a second end cap 102 defining a second end/surface of the example drive roller 100. As illustrated, the first end cap 101 and the second end cap 102 may be arranged on opposing lateral ends of the housing assembly 110 such that a roller width W of the drive roller 100, as defined by the housing assembly 110, is defined by the lateral distance in between the first and second end caps 101, 102, as measured in a lateral direction parallel to the central axis 106 defined by the drive roller 100 (e.g., in the x-direction as defined in the exemplary orientation illustrated in FIG. 4A). In various embodiments, the first end cap 101 may comprise a first appendage 101a configured to be operatively coupled to a conveyor at, for example, a first lateral sidewall and the second end cap 102 may comprise a second appendage 102a configured to be operatively coupled to the conveyor at a second lateral sidewall arranged opposite the first lateral sidewall. Further, in various embodiments, a drive roller 100 may comprises a power cable 105 disposed adjacent the second end cap 102 that is configured to be connected to a power supply. Additionally and/or alternatively, the power cable 105 may also be configured to provide an electronic connection for wired data transfer between the drive roller 100 (e.g., a controller disposed therein) and one or more components of the conveyor assembly, such as, for example, an imaging device, one or more other drive rollers, and/or the like.

As illustrated in FIG. 4A, In some examples, the housing assembly 110 (e.g., roller tube) of the reconfigurable drive roller 100 comprises a hollow cylindrical body and may comprise metal, plastic, combinations thereof, and/or the like. In various embodiments, the housing assembly 110 may be embodied by one or more tubular components arranged laterally in between the first end cap 101 and the second end cap 102 of the drive roller 100 such that the housing assembly 110 defines the adjustable roller width W of the drive roller 100. In various embodiments, the housing assembly 110 may have an adjustable configuration wherein the housing assembly 110 may be selectively reconfigured by being expanded and/or retracted between a nominal configuration and an expanded configuration in order to adjust the roller width defined by the drive roller 100.

In various embodiments, an exemplary housing assembly 110 may comprise a plurality of coaxial housing components configured to be moved laterally relative to one another in order to facilitate the arrangement of the arrangement of the housing assembly 110 between the nominal and expanded configurations, as describe herein. The plurality of housing components of the housing assembly 110 may define a series of hollow cylindrical tube components nested within one another and configured for lateral movement (e.g., in one or more lateral directions) relative to at least one housing component adjacent thereto such that the housing assembly 110 defines a telescoping configuration (e.g., a sequential sliding configuration, and/or the like) that is adjustable between a nominal (e.g., retracted) configuration, as illustrated in the exemplary embodiment shown FIG. 4A, and one or more expanded configurations, as described herein in reference to FIGS. 4B and 4C. As described herein, the telescoping configuration of a housing assembly 110 of an exemplary drive roller 100 may be defined by two outer housing components, each having an outer lateral end defined at a respective end cap (e.g., first end cap 101, second end cap 102) of the drive roller 110, two intermediate housing components, each being nested within a respective outer housing component and expandable/retractable relative thereto, and a central housing component defining a cylindrical tube having a first lateral end and an opposing second lateral end that are nested within respective intermediate housing components. For example, as described herein in reference to FIGS. 4B and 4C, the reconfiguration of the housing assembly 110 between a nominal configuration and an expanded configuration may be defined by a first outer housing component and a respective intermediate housing component interlocked therewith being moved in one of an outward lateral direction or an inward lateral direction relative to the central housing component, while a second outer housing component and a respective intermediate housing component interlocked therewith are moved relative to the central housing component in the opposite lateral direction (e.g., either towards or away from the first outer housing component).

As illustrated in FIG. 4A, an exemplary housing assembly 110 may be configured in a nominal configuration defined by the plurality of coaxial and interlocked housing components (e.g., the intermediate housing components and the central housing component) being fully retracted within two outer housing components 111, 112 that each define a component width between a respective end cap of the drive roller 100 and an outer housing component inner lateral end. For example, an exemplary housing assembly 110 may comprise a first outer housing component 111 having a first outer housing component width w1 defined between a first end cap 101 of the drive roller 100 and first outer housing component inner lateral end 111a, and a second outer housing component 112 having a second outer housing component width w2 defined between a second end cap 102 of the drive roller 100 and second outer housing component inner lateral end 112a. As illustrated, an exemplary housing assembly 110 may be configured such that in a nominal configuration, the first outer housing component inner lateral end 111a and the second outer housing component inner lateral end 112a are in physical contact with one another, defining an outer housing component interface 113 within an interface plane that is in between the first and second end caps 101, 102 and perpendicular to the central roller axis 106. In the illustrated nominal configuration, each of the intermediate housing components and the central housing component of the housing assembly 110 are fully retracted within one or more of the outer housing components 111, 112 and contained within an internal roller volume collectively defined by the hollow interiors of the first and second outer housing components 111, 112. In such an exemplary configuration, the adjustable roller width W is defined by the collective width of the first and second outer housing components 111, 112, such as, for example, the sum of the first outer housing component width w1 and the second outer housing component width w2.

In various embodiments, the adjustable roller width W of the drive roller 100 may be selectively increased by reconfiguring the housing assembly 110 from the nominal configuration (as illustrated in FIG. 4A), to an expanded configuration, such as, for example, a partially expanded configuration and/or a fully expanded configuration. FIG. 4B illustrates an exemplary drive roller 100 in a partially expanded configuration, wherein the roller width W is at least substantially greater than the roller width of the drive roller 100 in the nominal configuration, as discussed above in reference to FIG. 4A. As illustrated in FIG. 4B, an exemplary housing assembly 110 configured in a partially expanded configuration may be defined by the respective outer housing components having been moved laterally (e.g., along the central roller axis 106) in opposing lateral directions such that the respective intermediate housing components 121, 122 that are nested within the first and second outer housing components 111, 112 when the housing assembly is in the nominal configuration extend out from within the outer housing component 111, 112 interlocked therewith in a protruding arrangement relative to the respective outer housing component inner lateral end 111a, 112a. In various embodiments, the housing assembly 110 being reconfigured from a nominal configuration to the partially expanded configuration illustrated in FIG. 4B may be defined by the first outer housing component 111 being moved relative to the first intermediate housing component 121 along the central roller axis 106 in a first lateral direction away from the second outer housing component 112 (e.g., such as, for example, in the negative x-direction as defined in the exemplary orientation illustrated in FIG. 4B) and the second outer housing component 112 being moved relative to the second intermediate housing component 122 along the central roller axis 106 in an opposite second lateral direction away from the first outer housing component 111 (e.g., such as, for example, in the positive x-direction as defined in the exemplary orientation illustrated in FIG. 4B).

In various embodiments, as illustrated, an exemplary housing assembly 110 may comprise two intermediate housing components 121, 122 that each define a component width between a respective outer housing component (e.g., a corresponding outer housing component inner lateral end) and an intermediate housing component inner lateral end thereof. For example, an exemplary housing assembly 110 may comprise a first intermediate housing component 121 having a first intermediate housing component width w3 defined between the first outer housing component inner lateral end 111a of the first outer housing component 111 and a first intermediate housing component inner lateral end 121a. Further, the exemplary housing assembly 110 may comprise a second intermediate housing component 122 having a second intermediate housing component width w4 defined between the second outer housing component inner lateral end 112a of the second outer housing component 112 and a second intermediate housing component inner lateral end 122a.

As illustrated, an exemplary housing assembly 110 may be configured such that in a partially expanded configuration, the first intermediate housing component inner lateral end 121a and the second intermediate housing component inner lateral end 122a are in physical contact with one another, defining an intermediate housing component interface 123 within an interface plane that is in between the first and second outer housing components 111, 112 and perpendicular to the central roller axis 106. For example, the partially expanded configuration may be defined by the first and second outer housing components 111, 112 being moved in opposing outward lateral directions such that the first outer housing component inner lateral end 111a and the second outer housing component inner lateral end 112a are separated from one another by a lateral separation distance that is at least substantially equivalent to the collective width of the intermediate housing components defined by the sum of the first intermediate housing component width w3 and the second intermediate housing component width w4. As illustrated, the housing assembly 110 may be configured such that, as the housing assembly 110 is being reconfigured from a nominal position to the partially expanded configuration, the first and second intermediate housing components 121, 122 remain at least substantially stationary relative to one another throughout the telescoping expansion of the first and second outer housing components 111, 112 relative thereto. Further, in the illustrated partially expanded configuration, the central housing component of the housing assembly 110 is retracted within the intermediate housing components 121, 122 and fully contained within an internal roller volume collectively by the hollow interiors of the first and second intermediate housing components 121, 122. In such an exemplary configuration, the adjustable roller width W defined by the housing assembly 110 is defined by the collective width of the first and second outer housing components 111, 112 and the first and second intermediate housing components 121, 122, such as, for example, the sum of the first outer housing component width w1, the second outer housing component width w2, first intermediate housing component width w3, and the second intermediate housing component width w4.

In various embodiments, the adjustable roller width W of the drive roller 100 may be selectively increased by reconfiguring the housing assembly 110 from the partially expanded configuration (as illustrated in FIG. 4B), to a fully expanded configuration shown in FIG. 4C. FIG. 4C illustrates an exemplary drive roller 100 in a fully expanded configuration, wherein the roller width W is at least substantially greater than the roller width of the drive roller 100 in the partially expanded configuration, as discussed above in reference to FIG. 4B. As illustrated in FIG. 4C, an exemplary housing assembly 110 configured in a fully expanded configuration may be defined by the respective intermediate housing components 121, 122 having been moved laterally (e.g., along the central roller axis 106) in opposing lateral directions such that the respective lateral ends of the central housing component 130 disposed within the first and second intermediate housing components 121, 122 when the housing assembly 110 is in the partially expanded configuration extend out from within the intermediate housing component 121, 122 interlocked therewith in a protruding arrangement relative to the respective intermediate housing component inner lateral end 121a, 122a.

In various embodiments, the housing assembly 110 may comprise a central housing component 130 that embodies a hollow cylindrical tube having a coaxial central axis relative to the central roller axis 106 and defining an interlocking configuration with both the first intermediate housing component 121 and the second intermediate housing component 122 at opposing lateral ends thereof, respectively. In various embodiments, the housing assembly 110 being reconfigured from a partially expanded configuration to the fully expanded configuration illustrated in FIG. 4C may be defined by the first intermediate housing component 121 being moved relative to the first lateral end 130a along the central roller axis 106 in a first lateral direction away from the second intermediate housing component 122 (e.g., such as, for example, in the negative x-direction as defined in the exemplary orientation illustrated in FIG. 4C) and the second intermediate housing component 122 being moved relative to the second lateral end 130b along the central roller axis 106 in an opposite second lateral direction away from the first intermediate housing component 121 (e.g., such as, for example, in the positive x-direction as defined in the exemplary orientation illustrated in FIG. 4C).

In various embodiments, as illustrated, an exemplary housing assembly 110 may comprise a central housing component 130 having an effective component width defined between the first intermediate housing component 121 and the second intermediate housing component 122. For example, an exemplary housing assembly 110 may comprise a central housing component 130 having a central housing component width w5 defined between the first intermediate housing component inner lateral end 121a of the first intermediate housing component 121 and the second intermediate housing component inner lateral end 122a of the second intermediate housing component 122. In various embodiments, the central housing component 130 may embody a motor module within which one or more motor assemblies of the drive roller 100 may be housed.

As illustrated, an exemplary drive roller 100 may be configured such that reconfiguring the housing assembly 110 from the partially expanded configuration to a fully expanded configuration may be defined by the first and second intermediate housing components 121, 122 being moved in opposing outward lateral directions such that the first intermediate housing component inner lateral end 121a and the second intermediate housing component inner lateral end 122a are separated from one another by a lateral separation distance that is at least substantially equivalent to the central housing component width w5. In such an exemplary configuration, the adjustable roller width W defined by the housing assembly 110 is defined by the collective width of the first and second outer housing components 111, 112 the first and second intermediate housing components 121, 122, and the central housing component 130, such as, for example, the sum of the first outer housing component width w1, the second outer housing component width w2, first intermediate housing component width w3, the second intermediate housing component width w4, and the central housing component width w5.

Figure 5:
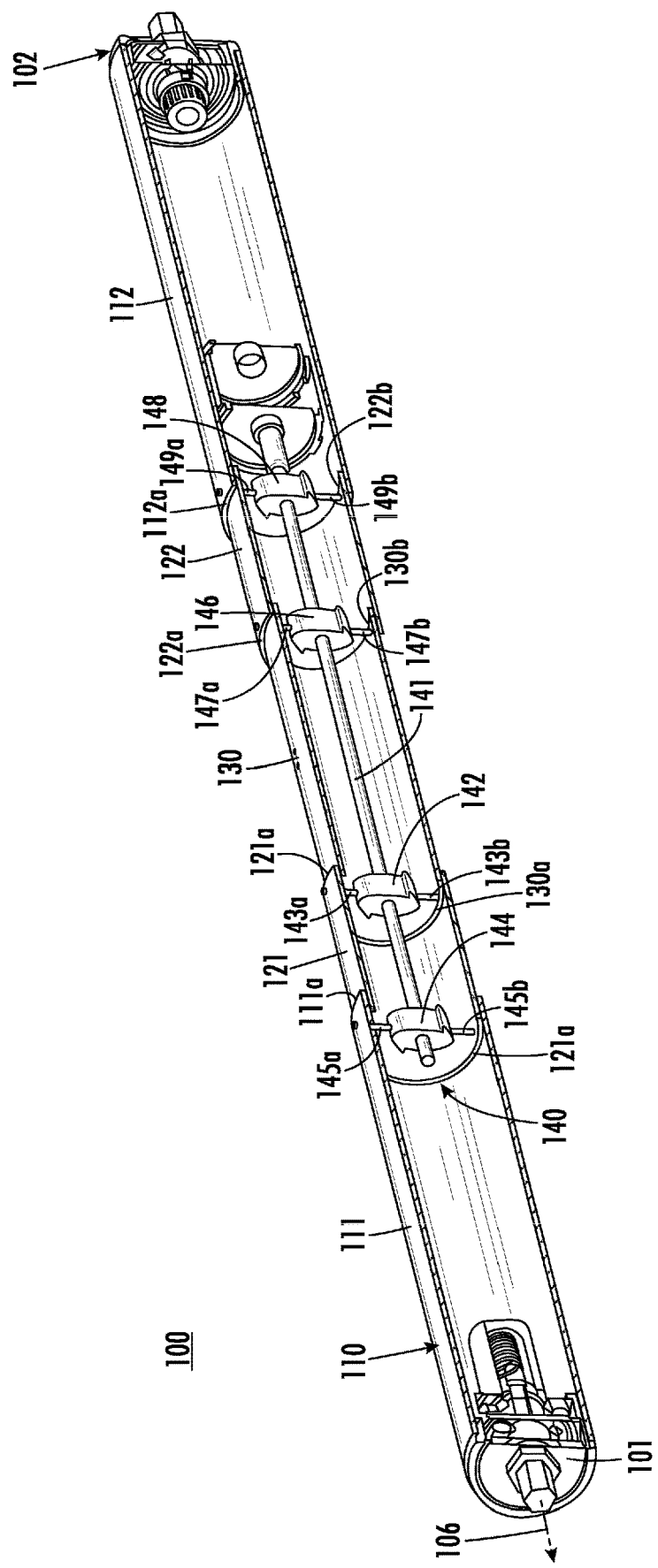
FIG. 5 illustrates a perspective cross-sectional view of exemplary reconfigurable drive roller according to various embodiments described herein.

In various embodiments, an exemplary drive roller 100 may comprise a housing adjustment assembly disposed within the housing assembly that is operable to adjust the roller width by facilitating the configuration of the housing assembly 110 between the nominal configuration and the one or more expanded configurations (e.g., the partially expanded configuration and the fully expanded configuration). As an illustrative example, FIG. 5 illustrates a perspective cross-sectional view of an exemplary drive roller 100 in accordance with various embodiments of the present disclosure is illustrated. In particular, FIG. 5 illustrates a perspective view of a cross-section of the exemplary drive roller 100 arranged in a fully expanded configuration, as described above in reference to FIG. 4C, and having a housing adjustment assembly 140 disposed within the housing assembly 110. As illustrated in FIG. 5, an exemplary drive roller 100 may comprise a housing assembly 110 embodying exterior shell that defines an interior roller portion comprising a hollow internal volume within the housing assembly 110 that extends along a central axis 106 between the opposing first and second end caps 101, 102 of the drive roller 100. The housing assembly 110 of the exemplary reconfigurable drive roller 100 may be reconfigured (e.g., extended and/or retracted) by a housing adjustment assembly 140 disposed within the internal roller portion of the housing assembly 110 in order to adjust the roller width defined by the housing assembly 110.

In various embodiments, the housing adjustment assembly 140 of an exemplary drive roller 100 may be operable to reconfigure the housing assembly 110 between the nominal configuration and the one or more expanded configurations by driving the relative lateral motion between adjacent housing components of the housing assembly 110 that are interlocked together to selectively extend and/or retract the telescoping arrangement defined by the plurality of housing components. For example, the housing adjustment assembly 140 may comprise various housing engagement elements disposed within the housing assembly 110 that are operatively engaged with each of the plurality of the outer housing components, the intermediate housing components, and the central housing component. As described herein, the housing adjustment assembly may be operated by motor of the drive roller 100 to cause a movement of each of the housing engagement elements that may initiate, drive, and/or otherwise result in at least a portion of the one or more of the housing components operatively engaged with the respective housing engagement elements being retracted and/or expanded relative to an adjacent housing component interlocked therewith.

As depicted, the housing adjustment assembly 140 can include a linear shaft component configured to be selectively rotated about a central axis independently of the rotation of the drive roller 100. In various embodiments, the shaft component of the housing adjustment assembly 140 may be elongated element having an at least substantially linear configuration, such as, for example, a shaft, a shaft component, a pin, and/or the like, or any other linear component operable to function as described herein with respect to the linear shaft component In various embodiments, the shaft component may have a plurality of cam elements attached thereto, each being operatively engaged with one or more housing components of the housing assembly 110 to facilitate a selective locking and unlocking of the housing components relative to one another. For example, an exemplary drive roller 100 may include a housing adjustment assembly 140 defining one or more mechanisms capable of being reconfigured so as to cause the one or more housing components operatively engaged therewith to switch back and forth between a locked configuration and an unlocked configuration relative to one another. As a non-limiting example, the exemplary drive roller 100 illustrated in FIG. 5 comprises a housing adjustment assembly 140 that includes a component shaft component extending laterally within the housing assembly 110 along the central axis 106 of the drive roller 100, the shaft component having a plurality of housing engagement elements distributed therealong at each of a plurality of interlocking portions defined by the housing assembly 110. In various embodiments, adjacent housing components of the housing assembly 110 may define an interlocking portion at the portion of each of the respective roller widths that remains in an overlapping and/or nested configuration relative to the other housing component upon the adjacent housing components being configured in a fully extended configuration relative to one another.

For example, each pair of adjacent housing components may define an interlocking portion in order to facilitate a telescoping configuration defined by the adjacent housing components having an at least partially limited range of lateral movement relative to one another. For example, in various embodiments, each of the plurality of housing components of the housing assembly 110 may comprise one or more pinholes through which a pin element maybe extended in order to anchor the position of an adjacent housing component (e.g., an aligned pinhole defined by an adjacent housing component) relative thereto. Adjacent housing components of the telescopic housing assembly 110 may be configured relative to one another such that each of the adjacent components defines a pinhole configured for receiving a pin there though within an interlocking portion defined by the housing component. Further, the housing assembly may be configured such that, when the adjacent housing components are arranged in a nominal (e.g., retracted configuration), the respective pinholes may be aligned with one another, such that a single spring-loaded pin element may be provided through each of the aligned pinholes to restrict the lateral movement of the adjacent interlocking housing components relative to one another. As an illustrative example, the interlocking configuration of the first outer housing component 111 and the first intermediate housing component 121 may be defined by each housing component defining a pinhole within a respective interlocking portion thereof such that a pin element provided through each respective pinhole may prevent further movement of the first outer housing component 111 relative to the first intermediate housing component 121 in the outward lateral direction. As described herein, the spring-loaded pins maybe arranged in a perpendicular direction relative to the outer shell surface of the roller and/or the central roller axis 106, so as to define a radial arrangement. Each spring-loaded pin element may be provided between the outer shell surface of one or more housing components (e.g. one or more pinholes defined by the housing component) and a corresponding housing engagement element defined by the housing adjustment assembly 140. For example, the spring loaded pin elements may define a biased configuration in a radially inward direction (e.g., toward the central roller axis 106).

For example, each of the housing engagement elements defined by the housing adjustment assembly 140 may embody cam elements configured to rotate about the central roller axis 106 with the shaft component 141. Based at least in part on the rotation and/or the angular configuration of the cam element about the central roller axis 106, as described in further detail herein, the cam element may physically abut a spring loaded pin element and cause the pin element engaged therewith to be moved in a radial direction relative to a pair of aligned pinholes defined by adjacent housing components of the housing assembly 110. For example, the housing adjustment assembly 140 may be configured such that rotating the shaft component 141 in a first rotational direction (e.g., about the central roller axis 106) may cause the cam elements to be rearranged so as to allow the biased configuration of one or more of the spring loaded pins to force the pin in a radially inward direction such that the disengages the pinhole of one of a pair of interlocked housing components (e.g., an outer housing component). Upon releasing from within the pinhole of the housing component, the pin element may be no longer positioned to restrict the lateral movement between the housing component and the adjacent housing component interlocked therewith. In various embodiments, the drive roller 100 may be configured such that, upon being disengaged by a spring loaded pin that is biased towards a central roller axis 106 such that the pin element moves out of physical contact with an outer-more positioned housing component of two adjacent housing components, the outer-more housing component automatically assume an expanded configuration relative to the inner-more adjacent housing component interlocked therewith.

Figure 6C:
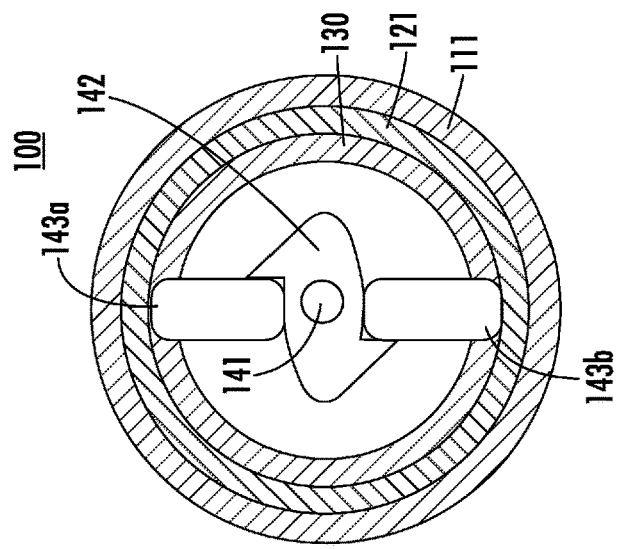
FIGS. 6A-6C illustrate cross-sectional side views of an example housing adjustment assembly of a reconfigurable drive roller in accordance with various embodiments of the present disclosure.
Figure 6B:
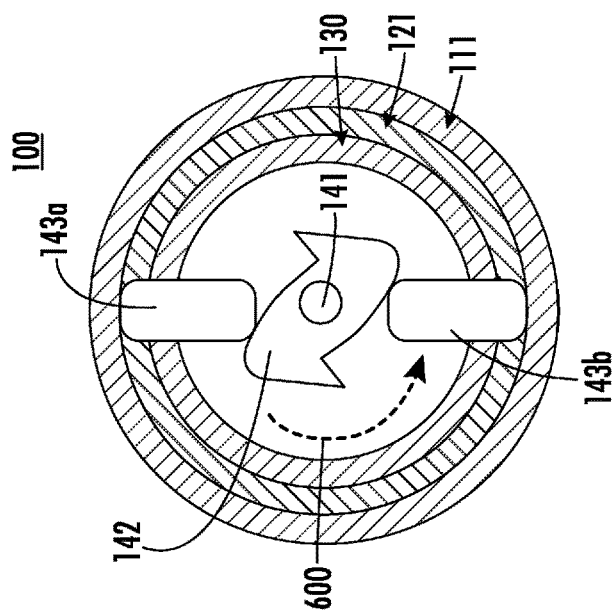
Figure 6A:
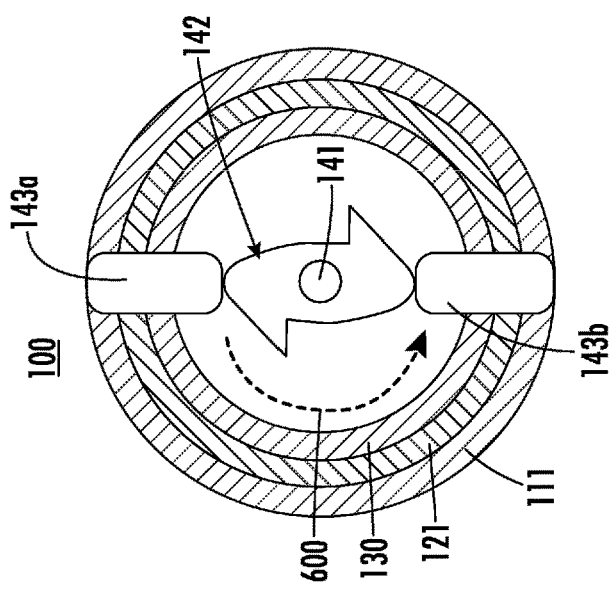

FIGS. 6A-6C schematically illustrate cross-sectional views of a plurality of interlocked housing components engaged with components of a housing adjustment assembly as the housing adjustment assembly is operated to adjust the roller width of the housing. For example, FIG. 6A illustrates an exemplary housing adjustment assembly comprising a cam element 142 that is provided along a shaft component 141 and configured to rotate with the shaft component 141 through a range of rotational motion in each of a first and a second rotational direction (e.g., about the roller central axis) to cause the housing assembly to be reconfigured in order to adjust the roller width of the drive roller. As illustrated in FIG. 6A, the cam element 142 is provided in a first position within the housing assembly wherein an opposing ends of the cam element 142 are engaged with a set of spring loaded pins 143a, 143b. The spring loaded pins 143a, 143b are each positioned within a respective alignment of pinholes defined by a plurality of interlocked housing components including the outer housing component 111, the intermediate housing component 121, and/or the central housing component 130, which collectively define a telescoping configuration enabling the selective adjustment of the roller width of the drive roller 100. In various embodiments, each of the spring loaded pins 143a, 143b may define a biased configuration in an inward radial direction (e.g., towards the central axis of the shaft component 141), such that an arrangement of the pins 143a, 143b within pinholes defined by an outer housing component 111 and/or an intermediate housing component 121, or a movement of the pins 143a, 143b in an outward radial direction may require one or more forces acting on the pins 143a, 143b from the cam element 142 (e.g., as a result of the rotational motion thereof) that counteracts the inward biasing forces being applied to each of the pins 143a, 143b.

The outer housing component 111, intermediate housing component 121, and the central housing component 130 defining the plurality of interlocked housing components are shown in FIG. 4A in a nominal configuration, wherein the intermediate housing component 121 and at least a portion of the central housing component 130 are retracted with in the outer housing component 111. As illustrated, a nominal configuration of a housing assembly may be further defined by the first set of spring loaded pins 143a, 143b being provided within a corresponding set of aligned pinholes defined by two or more of the central housing component 130, the intermediate housing component 121, and the outer housing component 111 such that the pins 143a, 143b are physically engaged with each of the interlocked housing components 111, 121, 130 at the respective pinholes. In such an exemplary configuration, wherein the spring loaded pins 143a, 143b are engaged with both the intermediate housing component 121 and the outer housing component 111, pins 143a, 143b may restrict the outer housing component 111 from moving laterally relative to the intermediate housing component 121 (e.g., and the central housing component 130). As the cam element 142 is rotated in a first rotational direction 600 (e.g., counterclockwise about the central axis of the shaft component 141 as defined by the exemplary orientation illustrated in FIG. 6A), the spring loaded pins 143a, 143b move in respective inward radial directions towards the shaft component 141 based at least in part on biasing forces acting on the spring loaded pins 143a, 143b. For example, in various embodiments, the cam element 142 may be configured such that a rotation of the cam element 142 may cause the counterbalance force being applied to each of the pins 143a, 143b by the cam element 142 to be reduced such that a biasing force(s) acting on the respective pins 143a, 143b may overcome the counterbalancing force(s), resulting in the pins 143a, 143b moving in an inward radial direction towards the shaft component 141.

As illustrated in FIG. 6B, the inward radial movement of the pins 143a, 143b caused by the rotation of the cam element 142 in the first rotation al direction 600 may result in the pins 143a, 143b moving out from within the respective pinholes defined by the outer housing component 111 such that the pins 143a, 143b disengage the outer housing component 111. In various embodiments, the spring loaded pins 143a, 143b disengaging the outer housing component 111 may correspond to the outer housing component being unlocked relative to at least the intermediate housing component 121 adjacent thereto such that the outer housing component 111 may move laterally relative to the intermediate housing component 121 (e.g., and/or central housing component 130). For example, an exemplary drive roller 100 may be configured such that upon the outer housing component 111 being disengaged by the locking pons 143a, 143b, as described herein, the outer housing component 111 may be laterally translated in an outward lateral direction relative to the intermediate housing component 121 and the central housing component 130 to increase the roller width of the drive roller 100 by reconfiguring the housing assembly in a partially expanded configuration and increase the roller.

As illustrated, the cam element 142 may be further rotated in the first rotational direction 600 (e.g., counterclockwise about the central axis of the shaft component 141 as defined by the exemplary orientation illustrated in FIG. 6B) such that the spring loaded pins 143a, 143b move further in respective inward radial directions towards the shaft component 141 based at least in part on the biasing forces acting on the spring loaded pins 143a, 143b. As illustrated in FIG. 6C, the inward radial movement of the pins 143a, 143b caused by the further rotation of the cam element 142 in the first rotation al direction 600 may result in the pins 143a, 143b moving out from within the respective pinholes defined by the intermediate housing component 121 such that the pins 143a, 143b disengage the intermediate housing component 121. In various embodiments, the spring loaded pins 143a, 143b disengaging the intermediate housing component 121 may correspond to the intermediate housing component 121 being unlocked relative to the central housing component 130 adjacent thereto such that the intermediate housing component 121 may move laterally relative to the central housing component 130. For example, an exemplary drive roller 100 may be configured such that upon the intermediate housing component 121 being disengaged by the locking pons 143a, 143b, as described herein, the intermediate housing component 121 may be laterally translated in an outward lateral direction relative to the central housing component 130 to further increase the roller width of the drive roller 100 by reconfiguring the housing assembly from the previously described partially expanded configuration (corresponding to the exemplary configuration depicted in FIG. 6B) to a fully expanded configuration defined by the exemplary configuration illustrated in FIG. 6C.

In various embodiments, an exemplary drive roller 100 may be configured such that the housing adjustment assembly being operated to cause the housing assembly to be reconfigured from the nominal position to a fully expanded configuration may correspond to the shaft component 141 of the housing adjustment assembly being rotated such that the cam element 142 rotates through a range of rotational motion of at least approximately 90 degrees. Further, in various embodiments, as illustrated in FIG. 6C, the housing adjustment assembly may be configured such that, upon the housing assembly being provided in a full expanded configuration, the spring loaded locking pins 143a, 143b disengaged with the outer housing component 111 and the intermediate housing component 121, as described above, may remain engaged with the central housing component 130 (e.g., at least partially disposed within respective pinholes defined by the central housing component 130).

Further, in various embodiments, an exemplary drive roller 100 may be configured to execute a retraction operation wherein the housing adjustment assembly may facilitate a reconfiguration of the housing assembly from a fully expanded configuration (as illustrated in FIG. 6C) to a nominal configuration (as illustrated in FIG. 6A) to operably reduce the roller width of the drive roller 100. The drive roller 100 (e.g., the housing adjustment assembly) may execute such a retraction operation by rotating the shaft component 141 in a second rotational direction opposite the first rotational direction 600 (e.g., clockwise about the central axis of the shaft component 141 as defined by the exemplary orientation illustrated in FIG. 6C). The housing adjustment assembly may be operated to rotate the cam element 142 in the second (e.g., opposite) rotational direction such that the spring loaded pins 143a, 143b engaged therewith are each pushed by respective surfaces of the cam element 142 in an outward radial direction. Such a movement of the pins 143a, 143b resulting from the rotation of the cam element 142 in the opposite rotational direction may result in the pins 143a, 143b moving back into the respective pinholes defined by the intermediate housing component 121 and/or the outer housing component 111, causing the housing assembly to be reconfigured back a partially expanded an/or a nominal configuration. In such an exemplary configuration, the intermediate housing component 121 and/or the outer housing component 111 may define a locked configuration wherein the lateral movement between the interlocked housing components is restricted by one or more sets of locking pins (e.g., pins 143a, 143b).

Referring back to the exemplary drive roller 100 illustrated in FIG. 5, a housing adjustment assembly 140 that includes a plurality of cam elements including a first cam element 142 engaged with a first set of spring loaded pins 143a, 143b, a second cam element 144 engaged with a second set of spring loaded pins 145a, 145b, a third cam element 146 engaged with a third set of spring loaded pins 147a, 147b, and a fourth cam element 148 engaged with a fourth set of spring loaded pins 149a, 149b. As illustrated, the first cam element 142 may be provided along the shaft component 141 in a position wherein the first set of spring loaded pins 143a, 143b engaged therewith are aligned with pinholes of the first intermediate housing component 121 and the central housing component 130 such that the rotation of the first cam element 142 controls the lateral movement of the first intermediate housing component 121 relative to the first lateral end 130a of the central housing component 130. Further, the second cam element 144 cam may be provided along the shaft component 141 in a position wherein the second set of spring loaded pins 145a, 145b engaged therewith are aligned with pinholes of the first outer housing component 111 and the first intermediate housing component 121 such that the rotation of the second cam element 144 controls the lateral movement of the first outer housing component 111 relative to the first intermediate housing component 121. The third cam element 146 may be provided along the shaft component 141 in a position wherein the third set of spring loaded pins 147a, 147b engaged therewith are aligned with pinholes of the second intermediate housing component 122 and the central housing component 130 such that the rotation of the third cam element 146 controls the lateral movement of the second intermediate housing component 122 relative to the second lateral end 130b of the central housing component 130. Further, the fourth cam element 148 cam may be provided along the shaft component 141 in a position wherein the fourth set of spring loaded pins 149a, 149b engaged therewith are aligned with pinholes of the second outer housing component 112 and the second intermediate housing component 122 such that the rotation of the fourth cam element 148 controls the lateral movement of the second outer housing component 112 relative to the second intermediate housing component 122.

While the exemplary reconfigurable drive rollers 100 in FIGS. 4A-6C depict example modular reconfigurable motorized conveyor rollers comprising a housing adjustment assembly 140 comprising a central shaft component element and plurality of cam elements engaged with the plurality of housing components, it is noted that the scope of the present disclosure is not limited to the examples shown in 4A-6C. It should be understood that in various embodiments, an example modular reconfigurable motorized conveyor roller in accordance with the present disclosure may comprise a housing adjustment assembly 140 that includes a variety of mechanical and/or electromagnetic components configured to facilitate the relative lateral movement(s) of the plurality of housing components that defines the telescopic configuration of the housing assembly 110. For example, in various embodiments, the housing adjustment assembly 140 may comprise one or more components such a, for example, a stationary pin element, configured to engage a helical profile defined along one or more surfaces of the housing assembly 110, and/or electromagnetic element(s) configured to drive a relative movement of various portions of the housing assembly 110. Further, in various embodiments, an exemplary drive roller 100 may include a housing assembly and/or housing adjustment assembly 140 having one or more components such as, for example, a snap pin mechanism, a pin and spring mechanism, a pneumatic locking component, a snap ring mechanism, one or more spring plunger components, a taper configuration assembly, one or more surface electromagnetic brakes, and/or the like, or any other locking component configured to at least partially restrict a lateral movement between the housing components defined by the housing assembly 110.

Figure 7A:
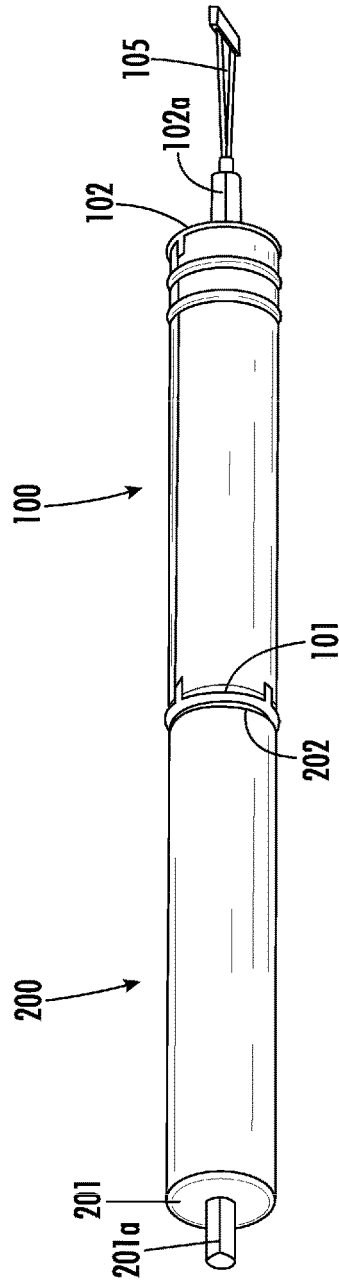
FIGS. 7A-7B illustrate various perspective views of exemplary modular drive rollers according to various embodiments described herein.
Figure 7B:
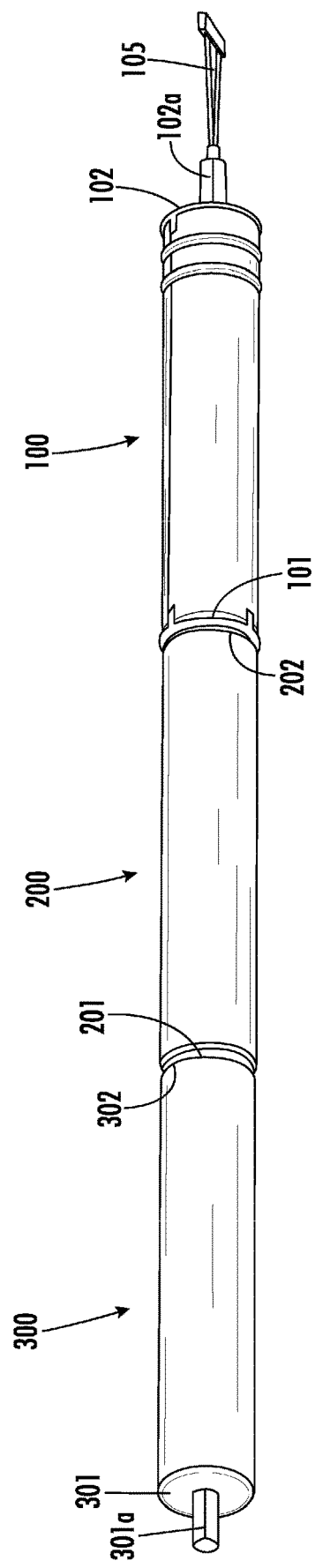

In various embodiments, an exemplary reconfigurable drive roller may be configured for attachment to one or more other conveyor rollers (e.g., one or more idler rollers and/or one or more drive rollers) to create one or more different modular configurations. FIGS. 7A-7B, for example, provide perspective views depicting a modular reconfigurable motorized conveyor roller in accordance with various embodiments of the present disclosure. The modular reconfigurable motorized conveyor roller can include multiple reconfigurable motorized conveyor rollers, including one or more drive rollers (e.g., drive roller 100) and one or more idler rollers (e.g., first idler roller 200 and second idler roller 300) that can be connected to form an aggregate motorized conveyor roller.

In various embodiments, the one or more drive rollers and the one or more idler rollers of the aggregate motorized conveyor roller may be arranged laterally relative to one another. One or more idler rollers, such as, for example, the first idler roller 200, may be attached to an end cap of one or more exemplary drive rollers, such as, for example, drive roller 100, to form the aggregate motorized conveyor roller having an increased the collective roller width relative to the roller width of the drive roller itself. For example, as illustrated in FIG. 7A, a second conveyor roller defining an idler roller 200 having a roller width defined between a first lateral end 201 and a second lateral end 202 may be operatively coupled to the drive roller 100 to form an aggregate motorized conveyor roller having a roller width defined by the sum of the roller widths of the drive roller 100 and the second conveyor roller 200. For example, the second lateral end 202 of the second conveyor roller 200 may be operatively attached to the first end cap 101 of the drive roller 100 such that the roller width of the aggregate conveyor roller defined by the second conveyor roller 200 and the drive roller 100 is defined between the first lateral end 201 of the second conveyor roller 200 and the second end cap 102 of the drive roller 100. In various embodiments, the coupling of the second conveyor roller 200 to the drive roller 100 may be defined by any appropriate fastening means configured to facilitate a coupling of the two conveyor rollers to increase the aggregate roller width while enabling the drive roller 100 to operably drive the rotation of the second conveyor roller 200 coupled thereto.

Further, as illustrated in FIG. 7B, a third conveyor roller defining an idler roller 300 having a roller width defined between a first lateral end 301 and a second lateral end 302 may be operatively coupled to the first idler roller 200 to form an aggregate motorized conveyor roller having a roller width defined by the sum of the roller widths of the drive roller 100, the first idler roller 200 and the second idler roller 300. For example, the second lateral end 302 of the second idler roller 300 may be operatively attached to the first lateral end 201 of the first idler roller 200 such that the roller width of the aggregate conveyor roller defined by the three conveyor rollers is defined between the first lateral end 301 of the second idler roller 300 and the second end cap 102 of the drive roller 100. While FIGS. 7A and 7B depict example modular reconfigurable motorized conveyor rollers, it is noted that the scope of the present disclosure is not limited to the examples shown in FIGS. 7A and 7B. An example modular reconfigurable motorized conveyor roller in accordance with the present disclosure can comprise one or more additional and/or alternative elements, and/or can be different from that illustrated in FIGS. 7A and 7B.

Figure 8:
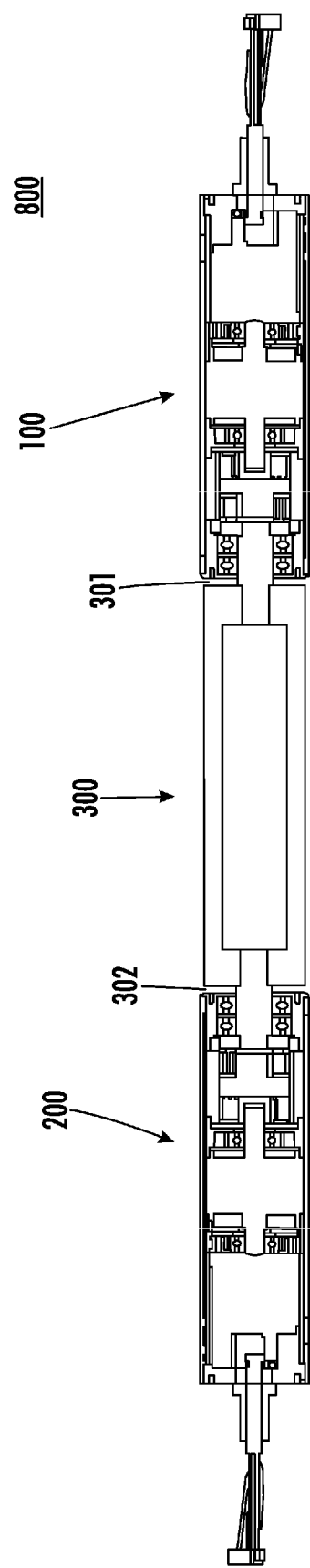
FIG. 8 illustrates an example modular reconfigurable conveyor roller in accordance with various embodiments of the present disclosure.

FIG. 8 illustrates a cross-sectional view of an exemplary modular reconfigurable motorized conveyor roller 800 in accordance with various embodiments of the present disclosure. In particular, the illustrated embodiment includes a modular conveyor roller assembly with a first drive roller 100, an idler roller 300 coupled at a first lateral end 301 thereof to the first drive roller 100, and a second drive roller 200 operatively coupled to a second lateral end 302 of the idler roller 300. As illustrated, the idler roller 300 of the modular reconfigurable motorized conveyor roller 800 may be positioned in between the first and second driver rollers 100, 200 and operatively connected to each of the first and second driver rollers 100, 200 such that the idler roller 300 may be selectively controlled by one or both of the drive rollers 100, 200.

In various embodiments, the first and second drive rollers 100, 200 of the modular reconfigurable motorized conveyor roller 800 may be independently controllable motor driven rollers (MDRs) that are each capable of rotating in either a first or a second rotational direction about a respective central roller axis (e.g., defining bi-directional operating function) at various rotational speeds to facilitate the transportation of an object disposed thereon along a transportation path. For example, in various embodiments, the first drive roller 100 may define a first lateral end of the modular reconfigurable motorized conveyor roller 800 while the second drive roller 200 defines an opposing second lateral end of the modular reconfigurable motorized conveyor roller 800. In various embodiments, the first and second drive rollers 100, 200 may be operated simultaneously according to the same operating condition, such as, for example, rotating in the same rotational direction at the same rotational speed, such that the modular reconfigurable motorized conveyor roller 800 embodies a singular conveyor roller having a roller width defined by the collective widths of each of the first drive roller 100, second drive roller 200, and idler roller 300. In such an exemplary circumstance, the idler roller 300 may be driven by the rotation of both the first and second drive rollers 100, 200. The simultaneous operation of both the first and second drive rollers 100, 200 in the same direction at the same rotational speed enables the modular reconfigurable motorized conveyor roller 800 to operate with a higher torque compared to alternative roller configurations driven by a singular drive motor being operated to drive an idler roller.

Further, in various embodiments, the first and second drive rollers 100, 200 may be operated simultaneously according to different operating conditions. For example, the first drive roller may be rotated in a first rotational direction while the second drive roller 200 is independently rotated in the opposite second rotational direction. As a further example, the first drive roller may be rotated at a first rotational speed while the second drive roller 200 operating in the same rotational direction is independently rotated at a different rotational speed. In such an exemplary configuration, the modular reconfigurable motorized conveyor roller 800 may be configured to selectively switch control the idler roller 300 between the first and second drive rollers 100, 200 based at least in part on one or more conveyor assembly requirements, dynamic throughput requirements, and/or the like.

As non-limiting example provided for illustrative purposes, FIGS. 9A and 9B schematically illustrate top views of exemplary conveyor apparatuses defining a plurality of a conveyor sections according to example embodiments described herein. In particular, FIG. 9A illustrates a conveyor section defined by a plurality of modular reconfigurable motorized conveyor rollers 900 (defining substantially the same configuration as the modular reconfigurable motorized conveyor roller 800 shown in FIG. 8), each comprising a first drive roller 910, a second drive roller 920, and an idler roller 930 disposed therebetween. As illustrated in FIG. 9A, the plurality of modular reconfigurable motorized conveyor rollers 900 may be configured such that the conveyor assembly defines a multi-row product line configuration. For example, the modular reconfigurable motorized conveyor roller 900 may be configured such that the idler roller 930 is controlled by the operation of the first drive roller 910, which is being operated according to a first operating condition that is at least substantially different than that second operating condition defining the operation of the second drive roller 920. Such a configuration enables the conveyor assembly to be operated using a first conveyor section 91 (e.g., row) that is operated by the first drive roller 910 and a second conveyor section 92 that is independently operated by the second drive roller 920. The conveyor assembly may define a first conveyor section 91 having a roller width corresponding to the cumulative width of the first drive roller 910 and the idler roller 930, and a second conveyor section 92 having a roller width corresponding to the roller width of the second drive roller 920.

In various embodiments, as illustrated in the exemplary configuration shown in FIG. 9A, the first conveyor section 91 may be operated in a first conveyor direction 900a at a first rotational speed controlled by the operation of the first drive roller 910 and the corresponding rotation of the idler roller 930. The second conveyor section 92 may be simultaneously operated in the first conveyor direction 900a at a second rotational speed controlled by the operation of the second drive roller 920, the second rotational speed being at least substantially different than the first rotational speed defined by the first conveyor section 91. Further, as illustrated in the exemplary configuration shown in FIG. 9B, the first conveyor section 91 may be operated in a first conveyor direction 900a controlled by the operation of the first drive roller 910 and the corresponding rotation of the idler roller 930, while the second conveyor section 92 simultaneously operated at in an opposite second conveyor direction 900b controlled by the operation of the second drive roller 920. Such exemplary configurations wherein the modular reconfigurable motorized conveyor rollers 900 is configured to enable selective control of a conveyor assembly according to a plurality of independently controllable conveyor sections (e.g., rows) enables a more flexible materials handling process capable of accommodating a variety of different conveyor assembly requirements.

Referring back to FIG. 8, while FIG. 8 depicts an example modular reconfigurable motorized conveyor roller 800 wherein the plurality of connected rollers defines an at least substantially linear arrangement, it is noted that the scope of the present disclosure is not limited to the example embodiment shown in FIG. 8. An example modular reconfigurable motorized conveyor roller 800 in accordance with the present disclosure can comprise one or more additional and/or alternative elements, and/or can be different from that illustrated in FIG. 8. As a non-limiting example, an example modular reconfigurable motorized conveyor roller 800 in accordance with the present disclosure may comprise a plurality of conveyor rollers connected to one another and defining a non-linear configuration wherein one or more of the conveyor rollers of the modular reconfigurable motorized conveyor roller 800 is arranged such that the central roller axis thereof is not coaxial with each of the other central roller axes defined within the modular reconfigurable motorized conveyor roller 800. In various embodiments, an exemplary modular reconfigurable motorized conveyor roller 800 comprising a plurality of modular rollers arranged in a non-linear configuration may be configured to accommodate one or more specific loading and/or unloading requirements of a particular materials handling environment.

Figure 10:
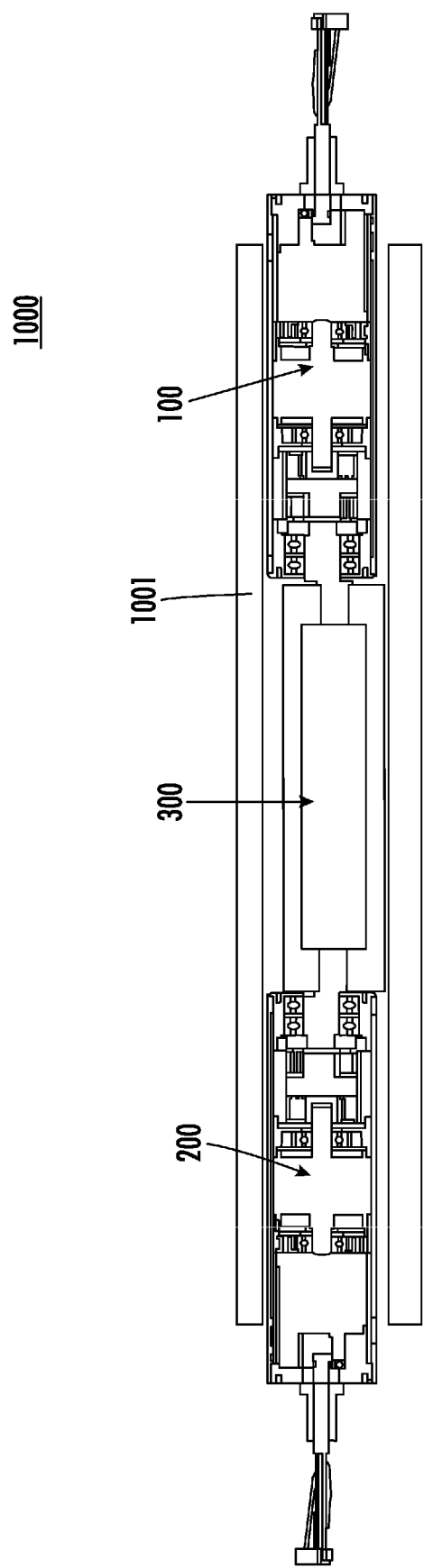
FIG. 10 illustrates an example modular reconfigurable conveyor roller in accordance with various embodiments of the present disclosure.

In various embodiments, as illustrated in FIG. 10, an exemplary modular reconfigurable motorized conveyor roller 1000 may include a roller belt 1001 disposed thereon. In such exemplary configurations, an exemplary modular reconfigurable motorized conveyor roller 1000 may be adjusted to maintain enough intact between plurality of conveyor rollers 100, 200, 300 and the roller belt 1001 to prevent belt slip due low tension between the conveyor rollers 100, 200, 300 and the roller belt 1001. For example, in various embodiments, the exemplary modular reconfigurable motorized conveyor roller 1000 may comprise a clutch mechanism configured to cause the idler roller shaft defined along a central roller axis of the idler roller 300 to be shifted in one or more directions (e.g., a longitudinal direction perpendicular to the central roller axis) such that the central roller shaft of the idler roller 300 is not coaxial with the corresponding central axes of the first and second drive rollers 100, 200. As illustrated, the idler roller may be linearly shifted relative to the first and second drive roller 100, 200 operatively connected on either side thereto in order to increase the collective cross-sectional profile of plurality of conveyor rollers 100, 200, 300 and cause the tension present within the roller belt 1001 to similarly increase. Alternatively, and/or additionally, in various embodiments, the exemplary modular reconfigurable motorized conveyor roller 1000 may comprise a chuck mechanism configured to facilitate an increase in the operative diameter of the idler roller 300, thereby increasing the collective cross-sectional profile of plurality of conveyor rollers 100, 200, 300 such that the tension present within the roller belt 1001 is similarly increased.

Figure 11:
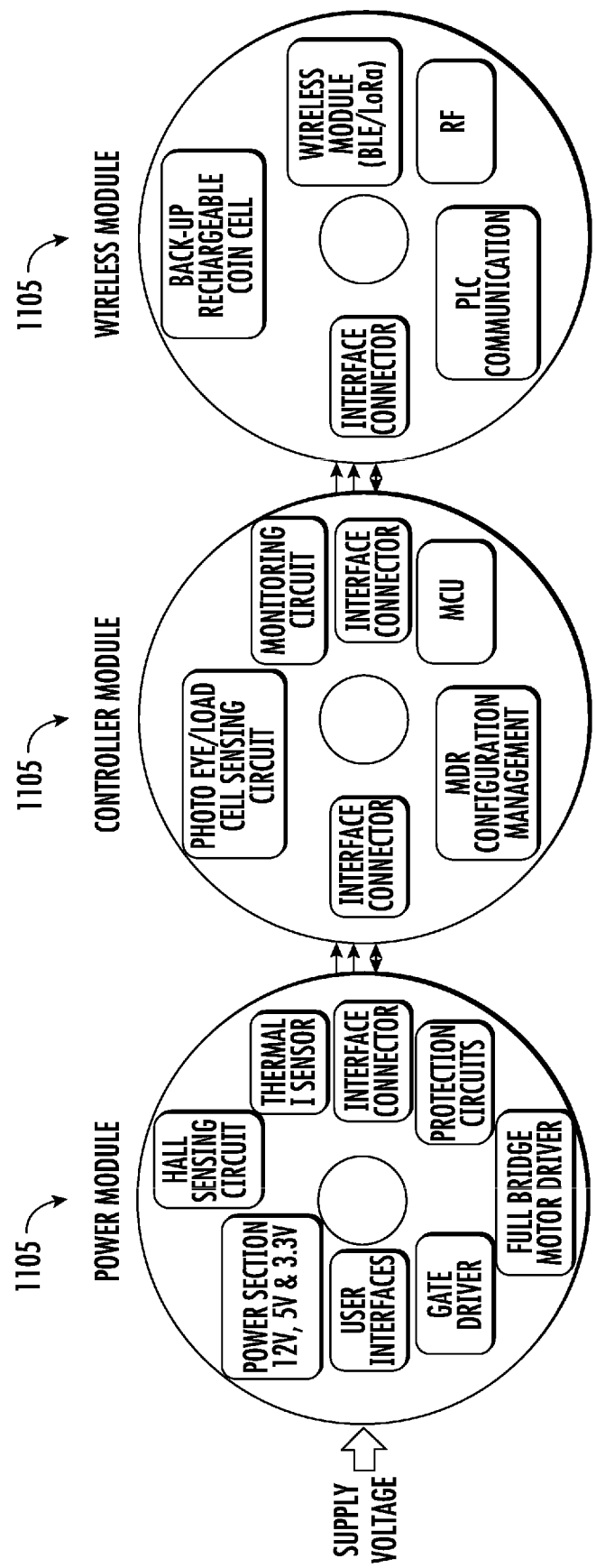
FIG. 11 illustrates an example controller component in accordance with various embodiments of the present disclosure.

In some embodiments, as depicted in FIG. 11, the controller component 1100/motorized conveyor roller can comprise a monitoring circuit for monitoring operations and/or operational conditions of the integrated motorized conveyor roller (e.g., providing self-check functionality) via one or more sensing elements. By way of example, a monitoring circuit of the controller component 1100 can be operatively coupled to a magnetic sensing element (e.g., an inductor or transformer). During operations, the rotation of the integrated motorized conveyor roller motor assembly generates a magnetic field which in turn generates a measurable electrical signal (e.g., voltage output) across the magnetic sensing element coupled thereto. An output of a comparator circuit can be used to provide an output describing one or more parameters associated with motorized conveyor roller (e.g., a lifetime motor operational time, number of rotations, loading conditions, vibrational information, installation issues, belt wear out, and/or the like). In some embodiments, at least a portion of the output of the comparator circuit can be measured and stored in memory. In some examples, the controller component 1100 can provide a control indication to actuate an LED element in response to detecting certain conditions (e.g., complete loss of motor function or overload scenario). In various embodiments, the controller component 1100 can be operatively coupled to other types of sensing elements including pressure sensors, vibrational sensors, temperature sensors, position sensors, and/or the like.

In various embodiments, the controller component 1100 can store (e.g., periodically and/or in response to requests) information/data describing various operational parameters of the integrated motorized conveyor roller including lifetime motor operational time, object information (e.g., information describing presence/absence of an object and/or other characteristics, image data or the like).

While FIG. 11 depicts an example controller component 1100 (e.g., PCB stack), it is noted that the scope of the present disclosure is not limited to the example shown in FIG. 11. An example controller component 1100 in accordance with the present disclosure can comprise one or more additional and/or alternative elements, and/or can be different from that illustrated in FIG. 11. For example, an integrated motorized conveyor roller in accordance with the present disclosure can comprise a single PCB or more than three PCBs.

Figure 12:
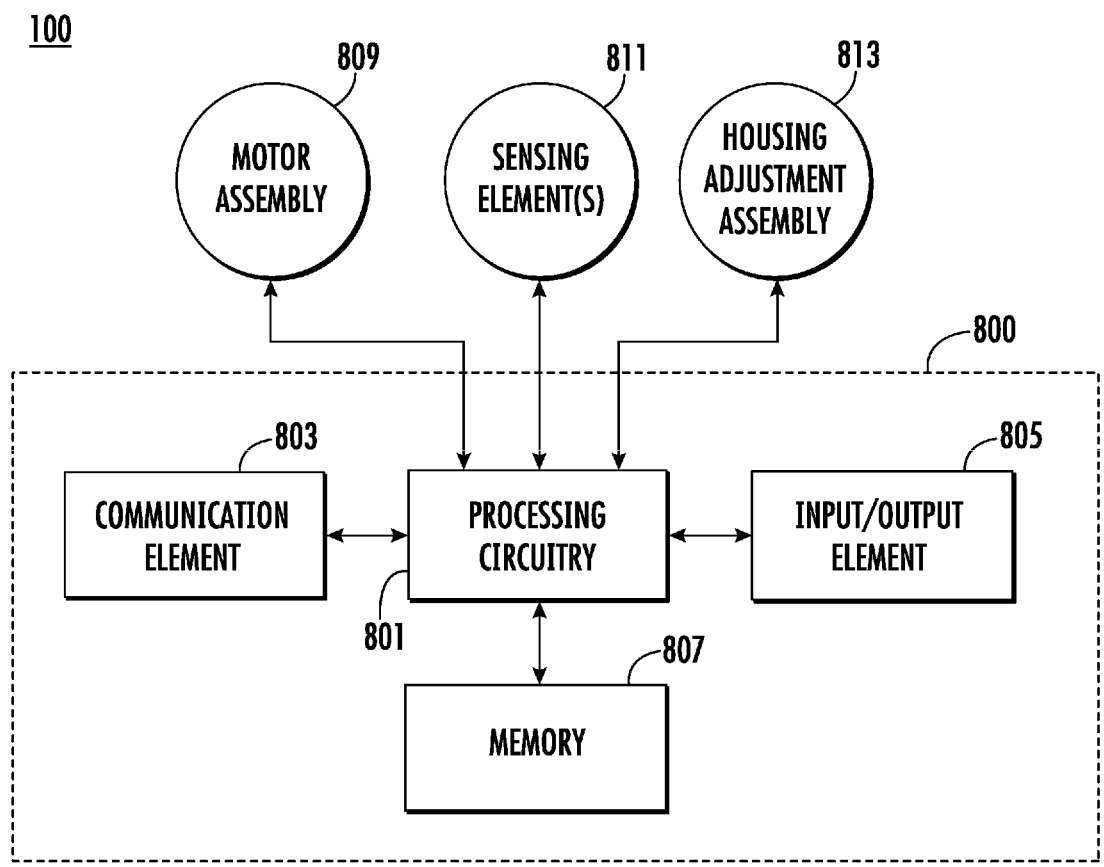
FIG. 12 illustrates an example controller component in electronic communication with various other components of an example integrated motorized conveyor roller in accordance with various embodiments of the present disclosure.

Referring now to FIG. 12, a schematic diagram depicting an example controller component 1200 in electronic communication with a motor assembly 1209, sensing element(s) 1211 and a housing adjustment assembly 1213 of an exemplary drive roller 100 (e.g., a motor driven roller) in accordance with various embodiments of the present disclosure is provided. As shown, the controller component 1200 comprises processing circuitry 1201, a communication element 1203, input/output element 1205, a memory 1207 and/or other components configured to perform various operations, procedures, functions or the like described herein.

In some embodiments, the controller component 1200 may be or comprise a PCB. In some examples, the controller component 1200 (e.g., PCB) may further comprise one or more of a full bridge motor driver, a hall sensor, one or more thermal sensors, one or more user interfaces, one or more protection circuits, configuration management circuitry 1209, a wireless interface, sensing element circuitry (e.g., image sensor circuitry), an interface connector, power control circuitry, gate driver circuitry and/or the like.

The processing circuitry 1201 may be embodied as means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, but not limited to, an application specific integrated circuit (ASIC) or field programmable gate array (FPGA), or some combination thereof. Accordingly, although illustrated in FIG. 12 as a single processor, in an embodiment, the processing circuitry 1201 may include a plurality of processors and signal processing modules. The plurality of processors may be embodied on a single electronic device or may be distributed across a plurality of electronic devices collectively configured to function as the circuitry of the motorized drive roller 100. The plurality of processors may be in operative communication with each other and may be collectively configured to perform one or more functionalities of the circuitry of the drive roller as described herein. In an example embodiment, the processing circuitry 1201 may be configured to execute instructions stored in the memory 1207 or otherwise accessible to the processing circuitry 1201. These instructions, when executed by the processing circuitry 1201, may cause the circuitry of the drive roller to perform one or more of the functionalities, as described herein, such as, for example, a roller width adjustment functionality.

Whether configured by hardware, firmware/software methods, or by a combination thereof, the processing circuitry 1201 may include an entity capable of performing operations according to embodiments of the present disclosure while configured accordingly. Thus, for example, when the processing circuitry 1201 is embodied as an ASIC, FPGA or the like, the processing circuitry 1201 may include specifically configured hardware for conducting one or more operations described herein. Additionally, or alternatively, when the processing circuitry 1201 is embodied as an executor of instructions, such as may be stored in the memory 1207, the instructions may specifically configure the processing circuitry 1201 to perform one or more algorithms and operations described herein.

Thus, the processing circuitry 1201 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a combination thereof. The memory can also be located internal to another computing resource (e.g., enabling computer readable instructions to be downloaded over the Internet or another wired or wireless connection).

The memory 1207 may include suitable logic, circuitry, and/or interfaces that are adapted to store a set of instructions that is executable by the processing circuitry 1201 to perform predetermined operations. Additionally or alternately, the memory 1207 may be configured to store data/information, application programs, instructions, and etc., so that the controller component 1200 can execute various functions according to the embodiments of the present disclosure. For example, in at least some embodiments, the memory 1207 is configured to cache input data for processing by the processing circuitry 1201. Thus, in at least some embodiments, the memory 1207 is configured to store program instructions for execution by the processing circuitry 1201. The memory 1207 may store information in the form of static and/or dynamic information. When the functions are executed, the stored information may be stored and/or used by the controller component 1200. Example memory implementations may include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an example embodiment, the memory 1207 may be integrated with the processing circuitry 1201 on a single chip, without departing from the scope of the disclosure.

The communication element 1203 may be implemented as any apparatus included in a circuit, hardware, a computer program product or a combination thereof, which is configured to receive and/or transmit data from/to another component or apparatus. The computer program product comprises computer-readable program instructions stored on a computer-readable medium (for example, the memory 1207) and executed by a processing component 1200 (for example, the processing circuitry 1201). In some embodiments, the communication element 1203 (as with other components discussed herein) may be at least partially implemented as the processing circuitry 1201 or otherwise controlled by the processing circuitry 1201. In this regard, the communication element 1203 may communicate with the processing circuitry 1201, for example, through a bus. The communication element 1203 may comprise, for example, antennas, transmitters, receivers, transceivers, network interface cards and/or supporting hardware and/or firmware/software, and is used for establishing communication with another apparatus. The communication element 1203 may be configured to receive and/or transmit any data that may be stored by the memory 1207 by using any protocol that can be used for communication between apparatuses. The communication element 1203 may additionally or alternatively communicate with the memory 1207, the input/output element 1205 and/or any other component of the processing component 1200, for example, through a bus.

In some embodiments, the processing component 1200 may comprise an input/output element 1205. The input/output element 1205 may communicate with the processing circuitry 1201 to receive instructions input by the user and/or to provide audible, visual, mechanical or other outputs to the user. Therefore, the input/output element 1205 may comprise supporting devices, such as a keyboard, a mouse, a display, a touch screen display, and/or other input/output mechanisms. Alternatively, at least some aspects of the input/output element 1205 may be implemented on a device used by the user to communicate with the processing component 1200. The input/output element 1205 may communicate with the memory 1207, the communication element 1203 and/or any other component, for example, through a bus. One or a plurality of input/output modules and/or other components may be included in the processing component 1200.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A reconfigurable motorized conveyor roller comprising:
   a housing assembly defining a roller width defined between a first lateral end and a second lateral end opposite the first lateral end; and
   a housing adjustment assembly disposed within the housing assembly that is operable to adjust the roller width by facilitating a configuration of the housing assembly between a nominal configuration and an expanded configuration;
   wherein the housing assembly comprises a plurality of coaxial housing components configured for movement relative to one another in one or more lateral directions, and wherein the housing adjustment assembly is operable to cause at least a portion of the plurality of coaxial housing components to move in one or more lateral directions to selectively configure the housing assembly between the nominal configuration and the expanded configuration;
   wherein the housing adjustment assembly is operable to cause:
      the housing assembly to be reconfigured from the nominal configuration to the expanded configuration as part of a roller expansion operation, wherein the roller expansion operation is based at least in part on a rotation of a shaft component of the housing adjustment assembly in a first rotational direction, and
      the housing assembly to be reconfigured from the expanded configuration to the nominal configuration as part of a roller retraction operation, wherein the roller retraction operation is based at least in part on a second rotation of the shaft component in a second rotational direction defining an opposite direction relative to the first rotational direction.

2. The reconfigurable motorized conveyor roller of claim 1, wherein at least the portion of the plurality of coaxial housing components define a telescoping configuration.

3. The reconfigurable motorized conveyor roller of claim 2, wherein each of the plurality of coaxial housing components define hollow cylindrical components.

4. The reconfigurable motorized conveyor roller of claim 1, wherein the plurality of coaxial housing components comprises an outer housing component and a central housing component configured to be at least partially disposed within the outer housing portion when the housing assembly is configured in the nominal configuration, and wherein the outer housing component is selectively moveable relative to the central housing component in the one or more lateral directions.

5. The reconfigurable motorized conveyor roller of claim 4, wherein the plurality of coaxial housing components further comprises a second outer housing component, the outer housing component being operatively connected to the first lateral end of the central housing component and the second outer housing component being operatively connected to the second lateral end of the outer housing component.

6. The reconfigurable motorized conveyor roller of claim 4, wherein the housing adjustment assembly is configured to adjust the roller width by being operated such that a first outer housing component and a second outer housing component are moved in opposite lateral directions relative to one another.

7. The reconfigurable motorized conveyor roller of claim 4, wherein the plurality of coaxial housing components further comprises an intermediate housing component that is operatively connected to the outer housing component at a first lateral intermediate housing component end and operatively connected to the central housing component at a second lateral intermediate housing component end.

8. The reconfigurable motorized conveyor roller of claim 1, further comprising:
a motor assembly and a drive assembly at least partially disposed within the housing assembly that are configured to cause rotation of at least a portion of the reconfigurable motorized conveyor roller, wherein a drive gear is operatively coupled to the motor assembly, and wherein the motor assembly is configured to rotate the drive gear to cause the rotation of a cam slotted gear.

9. The reconfigurable motorized conveyor roller of claim 1, further comprising:
a controller component in electronic communication with a motor assembly, a drive assembly, and the housing adjustment assembly, wherein the controller component is configured to cause a rotation of a drive gear.

10. A method of adjusting a roller width of a reconfigurable motorized conveyor roller, the method comprising:
providing the reconfigurable motorized conveyor roller comprising:
a housing assembly defining the roller width defined between a first lateral end and a second lateral end opposite the first lateral end; and
a housing adjustment assembly disposed within the housing assembly that is operable to adjust the roller width by facilitating a configuration of the housing assembly between a nominal configuration and an expanded configuration;
wherein the housing assembly comprises a plurality of coaxial housing components configured for movement relative to one another in one or more lateral directions;
causing, via the housing adjustment assembly, at least a portion of the plurality of coaxial housing components to move in one or more lateral directions to selectively configure the housing assembly between the nominal configuration and the expanded configuration;
wherein the housing adjustment assembly is operable to cause:
the housing assembly to be reconfigured from the nominal configuration to the expanded configuration as part of a roller expansion operation, wherein the roller expansion operation is based at least in part on a rotation of a shaft component of the housing adjustment assembly in a first rotational direction, and
the housing assembly to be reconfigured from the expanded configuration to the nominal configuration as part of a roller retraction operation, wherein the roller retraction operation is based at least in part on a second rotation of the shaft component in a second rotational direction defining an opposite direction relative to the first rotational direction.

11. The method of claim 10, wherein at least the portion of the plurality of coaxial housing components define a telescoping configuration.

12. The method of claim 11, wherein each of the plurality of coaxial housing components define hollow cylindrical components.

13. The method of claim 10, wherein the plurality of coaxial housing components comprises an outer housing component and a central housing component configured to be at least partially disposed within the outer housing portion when the housing assembly is configured in the nominal configuration, and wherein the outer housing component is selectively moveable relative to the central housing component in the one or more lateral directions.

14. The method of claim 13, wherein the plurality of coaxial housing components further comprises a second outer housing component, the outer housing component being operatively connected to a first lateral side of the central housing component and the second outer housing component being operatively connected to the second lateral end of the outer housing component.

15. The method of claim 13, wherein the housing adjustment assembly is configured to adjust the roller width by being operated such that a first outer housing component and a second outer housing component are moved in opposite lateral directions relative to one another.

16. The method of claim 13, wherein the plurality of coaxial housing components further comprises an intermediate housing component that is operatively connected to the outer housing component at a first lateral intermediate housing component end and operatively connected to the central housing component at a second lateral intermediate housing component end.

* * * * *